(12) United States Patent  
Ganti et al.

(10) Patent No.: US 8,996,559 B2
(45) Date of Patent: *Mar. 31, 2015

(54) ASSISTED QUERY FORMATION, VALIDATION, AND RESULT PREVIEWING IN A DATABASE HAVING A COMPLEX SCHEMA

(71) Applicants: Venkatesh Ganti, Cupertino, CA (US); Aaron Kalb, Mountain View, CA (US); Feng Niu, Mountain View, CA (US); Satyen Sangani, San Carlos, CA (US)

(72) Inventors: Venkatesh Ganti, Cupertino, CA (US); Aaron Kalb, Mountain View, CA (US); Feng Niu, Mountain View, CA (US); Satyen Sangani, San Carlos, CA (US)

(73) Assignee: Alation, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/058,184

(22) Filed: Oct. 18, 2013

(65) Prior Publication Data

US 2014/0280286 A1 Sep. 18, 2014

Related U.S. Application Data

(60) Provisional application No. 61/802,716, filed on Mar. 17, 2013, provisional application No. 61/802,742, filed on Mar. 18, 2013, provisional application No. 61/802,743, filed on Mar. 18, 2013, provisional application No. 61/802,744, filed on Mar. 18, 2013.

(51) Int. Cl.
*G06F 17/30* (2006.01)

(52) U.S. Cl.
CPC .... *G06F 17/30554* (2013.01); *G06F 17/30309* (2013.01); *G06F 17/30646* (2013.01)
USPC .......................................................... 707/766

(58) Field of Classification Search
CPC ................................................. G06F 17/30646
USPC .......................................................... 707/766
See application file for complete search history.

(56) References Cited

U.S. PATENT DOCUMENTS 5,255,386 A 10/1993 Prager
5,418,948 A 5/1995 Turtle
(Continued)

FOREIGN PATENT DOCUMENTS

EP 1548612 A1 6/2005
EP 1865423 A1 12/2007
(Continued)

OTHER PUBLICATIONS

"Open question answering over curated and extracted knowledge bases", ACM Digital Library, Aug. 24, 2014 by Anthony Fader et al. (p. 1) http://dl.acm.org/citation.cfm?id=2623677.

(Continued)

*Primary Examiner* — Rehana Perveen
*Assistant Examiner* — Tiffany Thuy Bui
(74) *Attorney, Agent, or Firm* — Raj Abhyanker, P.C.

(57) ABSTRACT

Disclosed are a method, a device and/or a system of assisted query formation, validation, and result previewing in a database having a complex schema. In one aspect, a method of a query editor includes generating a data profile which includes a set of characteristics captured at various granularities of an initial result set generated from an initial query using a processor and a memory. The method determines what a user expects in the initial result set of the initial query and/or a subsequent result set of a subsequent query based on the data profile and/or a heuristically estimated data profile. The method includes enabling the user to evaluate a semantic accuracy of the subsequent query based on the likely expectation of the user as determined through the set of characteristics of the data profile. The set of characteristics may include metadata of the initial query.

45 Claims, 26 Drawing Sheets

(56) References Cited

U.S. PATENT DOCUMENTS

| | | | |
|---|---|---|---|
| 5,724,571 A | 3/1998 | Woods | |
| 5,806,059 A | 9/1998 | Tsuchida et al. | |
| 5,845,278 A | 12/1998 | Kirsch et al. | |
| 5,915,249 A | 6/1999 | Spencer | |
| 5,926,811 A | 7/1999 | Miller et al. | |
| 6,055,567 A | 4/2000 | Ganesan et al. | |
| 6,078,924 A | 6/2000 | Ainsbury et al. | |
| 6,128,624 A | 10/2000 | Papierniak et al. | |
| 6,148,296 A | 11/2000 | Tabbara | |
| 6,212,517 B1 | 4/2001 | Sato et al. | |
| 6,336,132 B2 | 1/2002 | Appleman et al. | |
| 6,345,288 B1 | 2/2002 | Reed et al. | |
| 6,377,945 B1 | 4/2002 | Risvik | |
| 6,401,084 B1 | 6/2002 | Ortega et al. | |
| 6,457,002 B1 | 9/2002 | Beattie et al. | |
| 6,606,623 B1 | 8/2003 | Hsieh et al. | |
| 6,643,652 B2 | 11/2003 | Helgeson et al. | |
| 6,671,681 B1 | 12/2003 | Emens et al. | |
| 6,675,159 B1 | 1/2004 | Lin et al. | |
| 6,678,681 B1 | 1/2004 | Brin | |
| 6,694,331 B2 | 2/2004 | Lee | |
| 6,732,092 B2 | 5/2004 | Lucas et al. | |
| 6,745,178 B1 | 6/2004 | Emens et al. | |
| 6,748,398 B2 | 6/2004 | Zhang et al. | |
| 6,766,320 B1 | 7/2004 | Wang et al. | |
| 6,772,150 B1 | 8/2004 | Whitman et al. | |
| 6,778,979 B2 | 8/2004 | Grefenstette et al. | |
| 6,879,979 B2 | 4/2005 | Hindawi et al. | |
| 6,917,938 B2 | 7/2005 | Shea et al. | |
| 6,965,888 B1 | 11/2005 | Cesare et al. | |
| 6,983,287 B1 | 1/2006 | Jayanti et al. | |
| 7,013,312 B2 | 3/2006 | Bala et al. | |
| 7,111,002 B2 | 9/2006 | Zhang et al. | |
| 7,236,968 B2 | 6/2007 | Seki et al. | |
| 7,240,049 B2 | 7/2007 | Kapur | |
| 7,333,980 B2 | 2/2008 | Bjornson et al. | |
| 7,349,896 B2 | 3/2008 | Chowdhury et al. | |
| 7,370,034 B2 | 5/2008 | Franciosa et al. | |
| 7,430,505 B1 | 9/2008 | Horvitz et al. | |
| 7,558,778 B2 | 7/2009 | Carus et al. | |
| 7,565,345 B2 | 7/2009 | Bailey et al. | |
| 7,577,643 B2 | 8/2009 | Dominowska et al. | |
| 7,577,651 B2 * | 8/2009 | Jones et al. | 707/999.004 |
| 7,587,387 B2 | 9/2009 | Hogue | |
| 7,613,728 B2 | 11/2009 | Png et al. | |
| 7,636,714 B1 | 12/2009 | Lamping et al. | |
| 7,680,781 B1 | 3/2010 | Wasserman et al. | |
| 7,685,118 B2 | 3/2010 | Zhang | |
| 7,720,826 B2 | 5/2010 | Fitzer et al. | |
| 7,725,526 B1 | 5/2010 | Kraft | |
| 7,734,641 B2 | 6/2010 | Kanigsberg et al. | |
| 7,739,264 B2 | 6/2010 | Jones et al. | |
| 7,747,601 B2 | 6/2010 | Cooper et al. | |
| 7,747,606 B2 | 6/2010 | Dageville et al. | |
| 7,774,360 B2 | 8/2010 | Sun et al. | |
| 7,805,303 B2 | 9/2010 | Sugihara et al. | |
| 7,805,452 B2 | 9/2010 | Kano et al. | |
| 7,836,044 B2 | 11/2010 | Kamvar et al. | |
| 7,836,083 B2 | 11/2010 | Cipollone | |
| 7,849,080 B2 | 12/2010 | Chang et al. | |
| 7,860,852 B2 | 12/2010 | Brunner et al. | |
| 7,908,260 B1 | 3/2011 | Bushee | |
| 7,921,107 B2 | 4/2011 | Chang et al. | |
| 7,953,720 B1 | 5/2011 | Rohde et al. | |
| 7,953,746 B1 | 5/2011 | Garg et al. | |
| 7,962,466 B2 | 6/2011 | Jones et al. | |
| 7,979,412 B2 | 7/2011 | Johnson et al. | |
| 8,010,527 B2 | 8/2011 | Denoue et al. | |
| 8,015,176 B2 | 9/2011 | Colby et al. | |
| 8,020,110 B2 | 9/2011 | Hurst | |
| 8,024,341 B1 | 9/2011 | Even-Zohar et al. | |
| 8,046,354 B2 | 10/2011 | Day et al. | |
| 8,055,673 B2 | 11/2011 | Churchill et al. | |
| 8,055,675 B2 | 11/2011 | Higgins et al. | |
| 8,095,534 B1 | 1/2012 | Alexander | |
| 8,122,046 B2 | 2/2012 | Chang et al. | |
| 8,135,691 B2 | 3/2012 | Majd et al. | |
| 8,156,109 B2 | 4/2012 | Kamvar et al. | |
| 8,190,627 B2 | 5/2012 | Platt et al. | |
| 8,250,651 B2 | 8/2012 | Huang et al. | |
| 8,275,803 B2 | 9/2012 | Brown et al. | |
| 8,301,614 B2 | 10/2012 | Kraft et al. | |
| 8,326,842 B2 | 12/2012 | Vadlamani et al. | |
| 8,326,852 B2 | 12/2012 | Dettinger et al. | |
| 8,332,394 B2 | 12/2012 | Fan et al. | |
| 8,341,178 B2 | 12/2012 | Belknap et al. | |
| 8,346,701 B2 | 1/2013 | Wang et al. | |
| 8,346,753 B2 | 1/2013 | Hayes | |
| 8,359,312 B2 | 1/2013 | Grynberg | |
| 8,364,661 B2 | 1/2013 | Westphal | |
| 8,370,362 B2 | 2/2013 | Szabo | |
| 8,375,048 B1 | 2/2013 | Wad et al. | |
| 8,380,708 B2 | 2/2013 | Dettinger et al. | |
| 8,386,495 B1 | 2/2013 | Sandler et al. | |
| 8,438,165 B2 | 5/2013 | Ickman et al. | |
| 8,458,167 B2 | 6/2013 | Lohman et al. | |
| 8,484,208 B1 | 7/2013 | Raghavan et al. | |
| 8,489,633 B2 | 7/2013 | Chen et al. | |
| 8,504,908 B2 | 8/2013 | Chisholm | |
| 8,515,935 B1 | 8/2013 | Baluja et al. | |
| 8,515,948 B2 | 8/2013 | Chen et al. | |
| 8,521,731 B2 | 8/2013 | Broder et al. | |
| 8,527,893 B2 * | 9/2013 | Agrawal et al. | 715/771 |
| 8,533,177 B2 | 9/2013 | Huck et al. | |
| 8,601,002 B1 | 12/2013 | Ali et al. | |
| 8,606,739 B2 | 12/2013 | Apacible et al. | |
| 8,706,716 B2 | 4/2014 | Kuznetsov et al. | |
| 8,738,606 B2 | 5/2014 | Sarma et al. | |
| 8,738,617 B2 | 5/2014 | Brown et al. | |
| 8,738,621 B2 | 5/2014 | Hinrichs | |
| 8,751,477 B2 | 6/2014 | Bryant | |
| 8,751,520 B1 | 6/2014 | Bhattacharjee et al. | |
| 8,751,917 B2 | 6/2014 | Dhawan et al. | |
| 8,756,210 B1 | 6/2014 | Guha | |
| 8,756,241 B1 | 6/2014 | Thite et al. | |
| 8,762,384 B2 | 6/2014 | Heidasch | |
| 8,768,934 B2 | 7/2014 | Jones et al. | |
| 8,769,417 B1 | 7/2014 | Robinson et al. | |
| 8,776,062 B2 | 7/2014 | Garbow et al. | |
| 8,782,069 B2 | 7/2014 | Jockish et al. | |
| 8,788,527 B1 | 7/2014 | Nadel et al. | |
| 8,812,509 B1 | 8/2014 | Pasca et al. | |
| 8,812,534 B2 | 8/2014 | Platt et al. | |
| 8,819,593 B2 | 8/2014 | Hoogerwerf et al. | |
| 8,838,587 B1 | 9/2014 | Adams et al. | |
| 8,843,475 B2 | 9/2014 | Marshall | |
| 2001/0032211 A1 | 10/2001 | Kuzumaki | |
| 2002/0049738 A1 | 4/2002 | Epstein | |
| 2002/0073065 A1 | 6/2002 | Inaba et al. | |
| 2002/0073236 A1 | 6/2002 | Helgeson et al. | |
| 2002/0138465 A1 | 9/2002 | Lee | |
| 2002/0147724 A1 | 10/2002 | Fries et al. | |
| 2002/0169777 A1 | 11/2002 | Balajel et al. | |
| 2002/0194194 A1 | 12/2002 | Fenton et al. | |
| 2003/0065649 A1 | 4/2003 | Lucas et al. | |
| 2003/0074353 A1 | 4/2003 | Berkan et al. | |
| 2003/0126136 A1 | 7/2003 | Omoigui | |
| 2004/0034646 A1 | 2/2004 | Kimball et al. | |
| 2004/0049499 A1 | 3/2004 | Nomoto et al. | |
| 2004/0205050 A1 | 10/2004 | Stevens et al. | |
| 2004/0254917 A1 | 12/2004 | Brill et al. | |
| 2005/0086391 A1 | 4/2005 | Murata | |
| 2005/0187923 A1 * | 8/2005 | Cipollone | 707/3 |
| 2005/0222975 A1 | 10/2005 | Nayak et al. | |
| 2005/0222989 A1 | 10/2005 | Haveliwala et al. | |
| 2005/0283468 A1 | 12/2005 | Kamvar et al. | |
| 2006/0085391 A1 | 4/2006 | Turski et al. | |
| 2006/0190439 A1 | 8/2006 | Chowdhury et al. | |
| 2006/0204945 A1 | 9/2006 | Masuichi et al. | |
| 2006/0248044 A1 * | 11/2006 | Zhang et al. | 707/1 |
| 2006/0253495 A1 | 11/2006 | Png | |
| 2006/0265391 A1 | 11/2006 | Posner et al. | |
| 2007/0022099 A1 | 1/2007 | Yoshimura et al. | |
| 2007/0038601 A1 | 2/2007 | Guha | |

(56) References Cited

U.S. PATENT DOCUMENTS

| | | |
|---|---|---|
| 2007/0073683 A1 | 3/2007 | Kobayashi et al. |
| 2007/0250531 A1 | 10/2007 | Wiggins et al. |
| 2008/0065617 A1 | 3/2008 | Burke et al. |
| 2008/0082518 A1 | 4/2008 | Loftesness |
| 2008/0162498 A1 | 7/2008 | Omoigui |
| 2008/0189628 A1 | 8/2008 | Liesche et al. |
| 2009/0083226 A1 | 3/2009 | Kawale et al. |
| 2009/0182737 A1 | 7/2009 | Melman |
| 2009/0193036 A1 | 7/2009 | Petri |
| 2009/0216800 A1 | 8/2009 | Neil et al. |
| 2009/0248677 A1 | 10/2009 | Grynberg |
| 2010/0030753 A1 | 2/2010 | Nad et al. |
| 2010/0082604 A1 | 4/2010 | Gutt et al. |
| 2010/0094854 A1 | 4/2010 | Rouhani-Kalleh |
| 2010/0138402 A1 | 6/2010 | Burroughs et al. |
| 2010/0145976 A1 | 6/2010 | Higgins et al. |
| 2010/0185611 A1 | 7/2010 | Liao et al. |
| 2010/0191758 A1 | 7/2010 | Peng et al. |
| 2010/0198841 A1 | 8/2010 | Parker et al. |
| 2010/0250513 A1 | 9/2010 | Guha |
| 2010/0250578 A1 | 9/2010 | Athsani et al. |
| 2010/0281044 A1 | 11/2010 | Gupta et al. |
| 2010/0287175 A1 | 11/2010 | Beaudreau et al. |
| 2010/0306214 A1 | 12/2010 | Paparizos et al. |
| 2010/0306215 A1 | 12/2010 | Azar et al. |
| 2010/0332511 A1 | 12/2010 | Stockton et al. |
| 2011/0010367 A1 | 1/2011 | Jockish et al. |
| 2011/0047120 A1 | 2/2011 | Kamvar et al. |
| 2011/0047171 A1 | 2/2011 | Paparizos et al. |
| 2011/0055186 A1* | 3/2011 | Gopalakrishnan ............ 707/706 |
| 2011/0125734 A1 | 5/2011 | Duboue et al. |
| 2011/0131205 A1 | 6/2011 | Iyer et al. |
| 2011/0137932 A1 | 6/2011 | Wable |
| 2011/0214080 A1 | 9/2011 | Agrawal et al. |
| 2011/0219441 A1 | 9/2011 | Garg et al. |
| 2011/0258148 A1 | 10/2011 | Gao et al. |
| 2011/0270815 A1 | 11/2011 | Li |
| 2011/0270850 A1 | 11/2011 | Wana et al. |
| 2011/0289076 A1 | 11/2011 | Boyle et al. |
| 2012/0005223 A1 | 1/2012 | Marum et al. |
| 2012/0005224 A1 | 1/2012 | Ahrens et al. |
| 2012/0024030 A1 | 2/2012 | Chen et al. |
| 2012/0030227 A1 | 2/2012 | Mital et al. |
| 2012/0047145 A1 | 2/2012 | Heidasch |
| 2012/0077178 A1 | 3/2012 | Bagchi et al. |
| 2012/0078938 A1 | 3/2012 | Davis et al. |
| 2012/0095975 A1* | 4/2012 | Billingsley et al. ........... 707/705 |
| 2012/0102120 A1 | 4/2012 | Canoy et al. |
| 2012/0109992 A1* | 5/2012 | Chang et al. ................... 707/764 |
| 2012/0131033 A1 | 5/2012 | Bierner |
| 2012/0143895 A1 | 6/2012 | Salvetti et al. |
| 2012/0173992 A1 | 7/2012 | D'Angelo et al. |
| 2012/0226676 A1 | 9/2012 | Kasterstein et al. |
| 2012/0239653 A1 | 9/2012 | Platt et al. |
| 2012/0239679 A1 | 9/2012 | Gupta |
| 2012/0246576 A1 | 9/2012 | Baldwin et al. |
| 2012/0284305 A1 | 11/2012 | Kawai |
| 2012/0323909 A1 | 12/2012 | Behforooz et al. |
| 2013/0007044 A1 | 1/2013 | Eshwar et al. |
| 2013/0073546 A1* | 3/2013 | Yan et al. ....................... 707/732 |
| 2013/0091120 A1* | 4/2013 | Ganjam et al. ................ 707/714 |
| 2013/0103662 A1 | 4/2013 | Epstein |
| 2013/0132360 A1 | 5/2013 | Kuznetsov et al. |
| 2013/0144868 A1 | 6/2013 | Ickman et al. |
| 2013/0144892 A1 | 6/2013 | Cai et al. |
| 2013/0166530 A1 | 6/2013 | Pilat et al. |
| 2013/0166557 A1* | 6/2013 | Fricke et al. .................. 707/737 |
| 2014/0012842 A1 | 1/2014 | Yan et al. |
| 2014/0067534 A1 | 3/2014 | Wolfram et al. |
| 2014/0067782 A1 | 3/2014 | Waupotitsch et al. |
| 2014/0095528 A1 | 4/2014 | Garg et al. |
| 2014/0214820 A1 | 7/2014 | ODonnell |

FOREIGN PATENT DOCUMENTS

| | | |
|---|---|---|
| WO | 0182134 A1 | 11/2001 |
| WO | 0213065 A1 | 2/2002 |
| WO | 03083724 A1 | 10/2003 |
| WO | 2004003792 A1 | 1/2004 |
| WO | 2007112840 A1 | 10/2007 |
| WO | 2007068881 A3 | 1/2008 |
| WO | 2008042818 A3 | 9/2008 |
| WO | 2010078650 A1 | 7/2010 |
| WO | 2010105245 A2 | 9/2010 |
| WO | 2013101382 A1 | 7/2013 |
| WO | 2014074346 A1 | 5/2014 |

OTHER PUBLICATIONS

"QUIC: Handling Query Imprecision & Data Incompleteness in Autonomous Databases", Department of Computer Science and Engineering, Arizona State University, Tempe, AZ 85287, USA, Oct. 19, 2013 by Subbarao Kambhampati et al. (pp. 6) https://database.cs.wisc.edu/cidr/cidr2007/papers/cidr07p29.pdf.

"Using Materialized Query Tables", IBM Data Magazine, Sep. 15, 2009 by Roger Sanders (pp. 4) http://ibmdatamag.com/2009/09/using-materialized-query-tables/.

"Curating the CIA World Factbook", The International Journal of Digital Curation, University of Edinburgh, Dec. 2009 by Peter Buneman et al. (pp. 15) https://www.era.lib.ed.ac.uk/bitstream/1842/3203/1/IJDC_Iss3_Vol4_Buneman_et_al.pdf.

"Answering Search Queries with CrowdSearcher: A crowdsourcing and social network approach to search", Slideshare website, Apr. 20, 2012 by Marco Brambilla (pp. 5) http://www.slideshare.net/mbrambil/crowdsearcher-crowdsourcingsearchenginewww2012.

"Office 365", From Office 365 Wikipedia page, Nov. 4, 2014 (pp. 4) http://en.wikipedia.org/wiki/Office_365.

"The Beckman Report on Database Research" (Section 2.2—Diversity in the Data Management Landscape), Oct. 2013 by Daniel Abadi et al. (pp. 12) http://beckman.cs.wisc.edu/beckman-report2013.pdf.

"Getting started with schema.org", schema.org website, Nov. 4, 2014 (pp. 8) http://schema.org/.

"Curated Databases", University of California, Santa Cruz, Jun. 2008, by Peter Buneman et al. (pp. 12) http://users.soe.ucsc.edu/~tan/papers/2008/curateddbs.pdf.

"Databases+Wikis = Curated Databases", University of Edinburgh, by James Cheney et al. (pp. 11) http://homepages.inf.ed.ac.uk/jcheney/presentations/biodata-dbwiki.pdf.

"Data Provenance", University of Pennsylvania, May 2001 by Peter Buneman et al. (pp. 29) https://cs.uwaterloo.ca/~tozsu/seminars/notes/buneman.pdf.

"Query Optimization for Semistructured Data using Path Constraints in a Deterministic Data Model", University of Pennsylvania, 1999 by Peter Buneman et al. (pp. 12) http://homepages.inf.ed.ac.uk/opb/papers/DBPL1999a.pdf.

"A Query Language and Optimization Techniques for Unstructured Data", University of Pennsylvania, Jun. 1996 by Peter Buneman et al. (pp. 7) http://homepages.inf.ed.ac.uk/opb/papers/SIGMOD1996.pdf.

"Modelling and Visualising Traces for Reflexivity in Synchronous Collaborative Systems", IEEE Xplore Digital Library, Nov. 2009 by D Clauzel et al. (pp. 2) http://ieeexplore.ieee.org/xpl/login.jsp?tp=&arnumber=5369133&url=http%3A%2F%2Fieeexplore.ieee.org%2Fxpls%2Fabs_all.jsp%3Farnumber%3D5369133.

"A Case for a Collaborative Query Management System", Department of Computer Science and Engineering, University of Washington, Seattle, WA, USA, Jan. 7, 2009 by N. Khoussainova et al. (pp. 7) http://arxiv.org/ftp/arxiv/papers/0909/0909.1778.pdf.

"Creating User Accounts", Microsoft ASP.NET webpage, Jan. 18, 2008 by Scott Mitchell (pp. 28) http://www.asp.net/web-forms/overview/older-versions-security/membership/creating-user-accounts-cs.

* cited by examiner

ASSISTED QUERY FORMATION, VALIDATION, AND RESULT PREVIEWING IN A DATABASE HAVING A COMPLEX SCHEMA

CLAIM OF PRIORITY

This disclosure claims priority to, and incorporates herein by reference the entire specification of U.S. Provisional Patent Application No. 61/802,716 filed on Mar. 17, 2013 and titled DATA PROFILE DRIVEN QUERY BUILDER.

This disclosure claims priority to, and incorporates herein by reference the entire specification of U.S. Provisional Patent Application No. 61/802,742 filed on Mar. 18, 2013 and titled DEVELOPING A SOCIAL DATA CATALOG BY CROWD-SOURCING.

This disclosure claims priority to, and incorporates herein by reference the entire specification of U.S. Provisional Patent Application No. 61/802,743 filed on Mar. 18, 2013 and titled CREATING A DATA CATALOG BY MINING QUERIES.

This disclosure claims priority to, and incorporates herein by reference the entire specification of U.S. Provisional Patent Application No. 61/802,744 filed on Mar. 18, 2013 and titled AUTO-COMPLETION OF QUERIES WITH DATA OBJECT NAMES AND DATA PROFILES.

FIELD OF TECHNOLOGY

This disclosure relates generally to computing technology and, more particularly, to a method and system of assisted query formation, validation, and result previewing in a database having a complex schema.

BACKGROUND

A database may be created and maintained by a wide variety of users in an organization (e.g., Target®, eBay®, Walmart®, etc.). Over time, different engineers may use their own semantics when defining elements, variables, and/or attributes of the database. This may create semantic complexity that may make it difficult for others to run queries against the database without extensive experimentation.

For example, an analyst may seek to perform queries against the database based on a business requirement such as whether an item is likely to arrive at a particular distribution center in sufficient quantity for an expected holiday season based on forecasted supply and/or demand. However, the analyst may not know how to best execute his/her queries without a detailed understanding of the database schema, design, and/or table structure. In addition, the database may be massive, and queries to the database may take many minutes to execute. For this reason, it may be cumbersome for the analyst to execute the query. As a result, the productivity of engineers querying the database may be compromised.

SUMMARY

Disclosed are a method, a device and/or a system of assisted query formation, validation, and result previewing in a database having a complex schema.

In one aspect, a method of a query editor includes generating a data profile which includes a set of characteristics captured at various granularities of an initial result set generated from an initial query using a processor and a memory. The method determines what a user expects in the initial result set of the initial query and/or a subsequent result set of a subsequent query based on the data profile and/or a heuristically estimated data profile. The method includes enabling the user to evaluate a semantic accuracy of the subsequent query based on the likely expectation of the user as determined through the set of characteristics of the data profile.

The set of characteristics may include metadata of the initial query. For example, the set of characteristics may include a number of attributes in the initial result set, a data type of each of the attributes, a frequency of usage per user, a uniqueness constraint on the attributes, a nullability of individual attributes, and/or a functional dependency between attributes. The method may determine a match ratio between the subsequent query and the initial query. At least some of the set of characteristics of the data profile may be presented to the user based on the match ratio through the query editor.

The set of characteristics may include individual row characteristics. The data profile may include a random sample of information presented in the initial result set. The user may be able to perform a cursory examination of the presented ones of the set of characteristics and/or the random sample of information presented in the initial result set and/or the subsequent result set (e.g., based on the match ratio between the subsequent query and the initial query). The set of characteristics may include aggregate statistical characteristics including generic aggregate statistics and scenario aggregate statistics. The generic aggregate statistics may be calculated in a manner that is independent of a set of semantics of the attributes. The scenario aggregate statistics may be defined through a domain expert. The scenario aggregate statistics may be relevant in a particular scenario to enable the incorporation of a domain-specific interpretation of semantics of each attribute and each set of data of the initial result set and/or the subsequent result set.

The generic aggregate statistics may include number of rows of the initial result set and/or the subsequent result set, a count of distinct values in each attribute, a distribution of attribute values including frequency per attribute value, a pattern of attribute values for attribute values and/or a set of functional dependencies among attribute value pairs. The generic aggregate value statistics may be applicable with no customization by the user. The scenario aggregate statistics may be programmed via user-defined aggregate queries and may be associated with the initial result set and the subsequent result set.

The syntax of the user-defined aggregate queries may be specific to a standard query processing engine and the signature of the scenario aggregate statistics may create the signature corresponds to a set of table valued functions. The method may present the set of characteristics of the data profile to the user through the query editor based on an auto-complete algorithm to which the data profile and/or the initial result set and/or the subsequent result will be predicted when a partial input of the initial query and/or the subsequent query is entered in the query editor.

The set of characteristics of the data profile may be presented to the user of the query editor through a profile visualizer module. The module may generate a visual representation of the data profile in a searchable format and/or a hierarchical format and/or a navigable format. The method may include computing the data profile through a result set profiler module which may map each attribute value of the attribute to the number of times particular value is observed in the attribute and may map patterns exhibited by an attribute value to a count of times pattern is observed in the attribute.

The pattern may be constructed based on a regular expression of string-valued attributes. The method may permit the user to provide a user defined table value function using a visual interface through an application programming interface. The application program interface may consider a data source and/or a table and/or a table value aggregate query data as an input to be registered with the result set profiler. The user may be permitted to mark the subsequent query as completed after an iterative evaluation of the data profile generated from previous queries. The method may generate sample database having an identical schema which includes a potentially biased random sample of all the relations with a reduced set of data. The method may execute the subsequent query through the use of sample database to enable the user to reduce the time in debugging the subsequent query.

The method may apply a reservoir sampling algorithm to ensure a constant sample size is maintained. Each row in the subsequent result set of any subsequent query is selected with a same probability in a manner such that a tuple selected by many subsequent queries in a query log is likely to be selected in the potentially biased random sample with a higher probability. The method may generate an aggregate value based on the potentially biased random sample through a heuristical-estimation algorithm. The method may monitor the behavior of the user in interacting with the set of characteristics of the data profile when the subsequent query is generated. Further, the method may refine an presentation algorithm which may optimally determines the characteristics to present the user based in further query based on a monitored behavior of the user interacting with initial query and/or the subsequent query in the query editor.

In another aspect, a query editor application includes a result set profiler module to generate a data profile which includes a set of characteristics captured at various granularities of an initial result set generated from an initial query using a processor and a memory. The query editor application also includes a heuristical-estimation module to determine what a user expects the initial result set of the initial query and/or in a subsequent result set of a subsequent query based on the data profile and/or a heuristically estimated data profile. Furthermore, the query editor application includes a profile visualizer module to enable the user to evaluate a semantic accuracy of the subsequent query based on the likely expectation of the user as determined through the set of characteristics of the data profile.

In yet another aspect, a non-transitory medium, readable through a processor and a memory, which includes instructions embodied that are executable through the processor and the memory includes the instructions to determine what a user expects in one of an initial result set of an initial query and/or a subsequent result set of a subsequent query based on a data profile and/or a heuristically estimated data profile. The non-transitory medium includes the instructions to enable the user to evaluate a semantic accuracy of the subsequent query based on the likely expectation of the user as determined through a set of characteristics of the data profile. The method further includes instructions to present some set of characteristics of the data profile to the user based on the match ratio through the query editor.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a method, a device and/or a system of assisted query formation, validation, and result previewing in a database having a complex schema.

Figure 1:
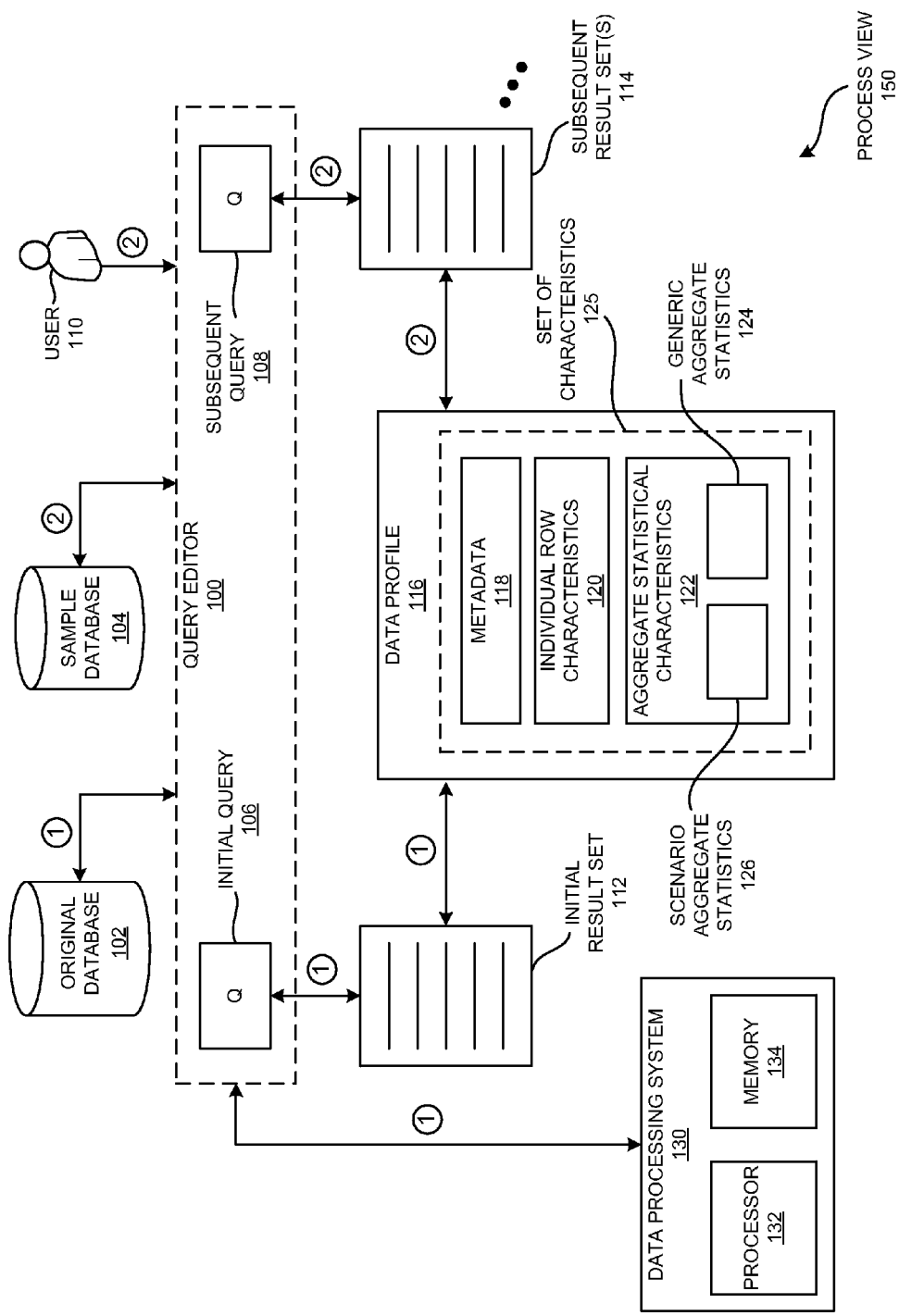
FIG. 1 is a block diagram showing the process view of a system for assisted query formation, validation, and result previewing, according to one embodiment.

FIG. 1 is a block diagram showing the process view 150 of a system for assisted query formation, validation, and result previewing, according to one embodiment. FIG. 1 shows a query editor 100, an original database 102, a sample database 104, an initial result set 112, a data profile 116, a collection of subsequent result sets a data processing system 130.

According to one embodiment, a query editor 100 is software running on a data processing system 130 such as a desktop computer, a laptop computer, and/or a remote computational server. The processing system 130 utilizes a processor 132 to execute software instructions stored in memory 134, according to one embodiment. The processor 132 stores state information associated with these executed instructions within both the processor 132 and the memory 134 of the data processing system, according to one embodiment. According to one embodiment, the processor 132 may be a central processing unit (CPU), a microprocessor, and/or any other hardware within a computer system that carries out the instructions of a program by performing the basic arithmetical, logical, and input/output operations of the system. According to one embodiment, a memory 134 may be a random access memory (RAM), a read only memory (ROM), a flash memory, and/or any other physical devices used to store programs and/or data for use in a digital electronic device.

User 110 desires to construct a query that retrieves information from the original database that satisfies some informational need, according to one embodiment. User 110 interacts with the query editor 100 to produce an initial query 106 and zero and/or more one of the subsequent query 108 through a process of iterative refinement, according to one embodiment. An initial query 106 and any subsequent query 108 are syntactic representations of retrieval operations to be performed upon information stored in the original database 102 and/or the sample database 104, according to one embodiment. This syntactic representation may take the form of Structured Query Language and/or any other information retrieval language required by original database 102 and/or the sample database 104, according to one embodiment. The query editor 100 submits the initial query 106 and any subsequent query 108 to the sample database 104 on behalf of user 110 to generate the initial result set 112 and any subsequent result set 114, according to one embodiment.

The sample database 104 contains a biased random subset of the content within the original database 102, according to one embodiment. The sample database 104 and the original database 102 exhibit the same structural schema, tables and views with the same number of columns and identical column names and column definitions (e.g. data types and constraints), according to one embodiment. The sample database 104 will serve as a proxy data source with the purpose of reducing query latency during iterative refinement of initial query 106 into various subsequent queries, according to one embodiment. The storage units (e.g. tables) in the sample database 104 may store less data than those in the original database, but maybe identical for performance reasons, according to one embodiment.

The data profile 116 captures all the interesting characteristics of an initial result set 112 and/or subsequent result set 114, according to one embodiment. The data profile 116 includes of metadata 118, individual row characteristics 120, aggregate statistical characteristics 122, according to one embodiment. Aggregate statistical characteristics 122 may comprise generic aggregate statistics 124 and scenario aggregate statistics 126, according to one embodiment. Metadata 118 includes, but is not limited to, the number of attributes in the result set, the data types of each attribute, the uniqueness constraints on certain attributes and/or attribute sets, nullability of individual attributes, and functional dependencies across attributes and/or sets of attributes, according to one embodiment. The data profile 116 may be stored as a structured text file using the INI format, extensible markup language (XML), JSON, YAML, and/or other configuration file format, and/or within some data storage system such as a relational database (e.g. MySql®, Oracle®, and/or SQLite®), key-value and/or document-stores (e.g. Cassandra®, CouchDB®, and/or MongoDB®), and/or a persistent data structure such as a Java® HashMap serialized to a file, according to one embodiment.

Individual row characteristics 120 are a random sample of an initial result set 112 and/or a subsequent result set 114 and are used by the user to evaluate whether and/or not there are obvious patterns and/or anomalies, according to one embodiment.

Generic aggregate statistics 124 are used to validate the semantic accuracy of an initial query 106 and/or subsequent query 108, according to one embodiment. Generic aggregate statistics 124 may include initial result set 112 and subsequent result set 114 statistics unrelated to the semantics of the result set attributes, according to one embodiment. These statistics include, but are not limited to, number of rows, number of distinct values in each attribute, frequency distributions of attribute values, patterns of attribute values (such as distribution by number of digits for integer values, the joint distribution of digits to the right and left of the decimal point for floating point values, and/or a set of regular expressions for string values), and functional relationships among attribute value pairs, according to one embodiment. Generic aggregate statistics 124 may have configuration parameters such as number of bins and bin widths for frequency distributions and/or pattern lists, but generally are predefined without any customization by the user 110, according to one embodiment. Computation of generic aggregate statistics 124 can be optimized and will often be computed with one and/or a few scans of the data, according to one embodiment.

Scenario aggregate statistics 126 capture statistics related to the semantics of the result set attributes, according to one embodiment. These statistics are defined by user 110 during the refinement process to capture scenario specific expectations of desired query behavior, according to one embodiment. Scenario aggregate statistics 126 are defined using the syntax specific to query processing engines of original database 102 and sample database 104 and operate on an initial result set 112 and/or subsequent result set 114, according to one embodiment.

Figure 2:
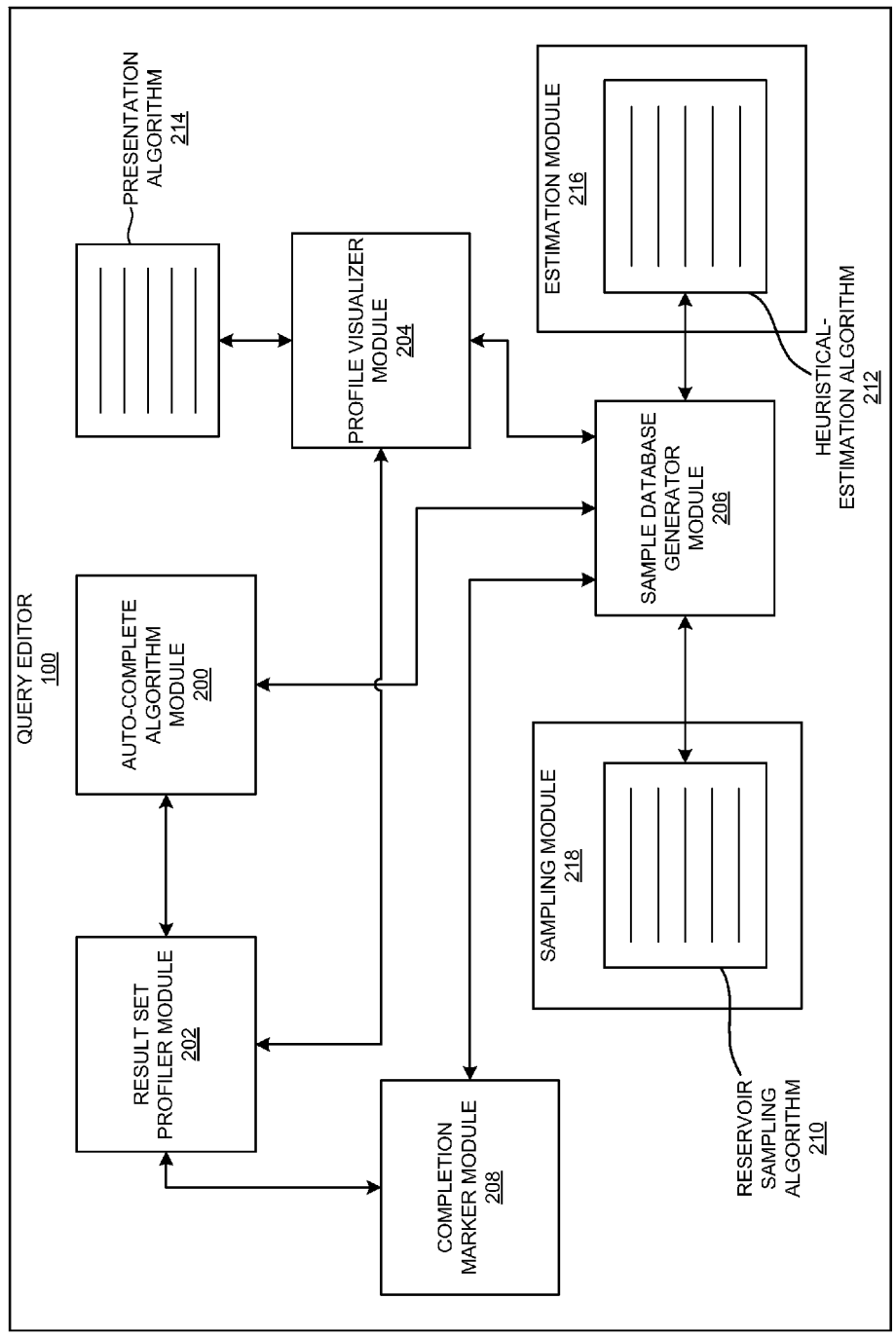
FIG. 2 is a block diagram of the query editor, according to one embodiment.

FIG. 2 is a block diagram of the query editor 100, according to one embodiment. The query editor allows the use 110 to write queries, validate queries, and execute queries, as well as configure the environment in which these processes operate, according to one embodiment. The initial query 106 and/or a subsequent query 108 is built within the query editor 100. The query editor 100 may include an auto-complete algorithm module 200, a result set profiler module 202, profile visualizer module 204, a sample database generator module 206, a completion marker module 208, a sampling module 218, and an estimation module 216.

The result set profiler module 202 takes an initial result set 112 and/or subsequent result set 114 and computes the data profile 116, according to one embodiment. It scans each row the result set and maintains several key-value mappings that map a pattern to the frequency of attribute values that match the pattern, according to one embodiment. These mapping include, but are not limited to, item frequency (the pattern is the value), numeric representation patterns such as the number of digits for integers and the number of digits before and after the decimal point for floating point number, string patterns defined by regular expressions, and/or scenario specific pattern sets such as expected functional relationships, according to one embodiment.

The sampling module 218 employs a reservoir sampling algorithm 210, according to one embodiment. The reservoir sampling algorithm 210 examines queries from query logs 700 and fills the sample database 104 with randomly select rows that satisfy the conditional clause (e.g. WHERE for Structured Query Language), according to one embodiment. If no such conditional clauses are found, then the reservoir sampling algorithm 210 will sample uniformly from all rows, according to one embodiment. Reservoir sampling techniques, and/or other techniques for sampling a fixed number of items from a set of items, will ensure that the size of the tables in the sample database 104 will remain constant, with new rows displacing old rows within the sample database 104, according to one embodiment. This method may introduce duplicate rows into the sample database 104, according to one embodiment. The reservoir sampling algorithm may augment each row with a frequency count instead storing duplicates rows directly, according to one embodiment. For databases with star schema, the sampling module 218 may only sample the main fact table while retaining copies of the dimension tables, especially if the dimension tables are relatively small, according to one embodiment.

The estimation module 216 contains a heuristical estimation algorithm 212, according to one embodiment. The heuristical estimation algorithm 212 estimates the results of aggregate value queries against the original database 102 based upon the results of queries against the sample database 104, according to one embodiment. The sampling bias introduced by the sampling module 218 may be used by the heuristical estimation algorithm 212, according to one embodiment. Assumptions of independence can help extrapolate the aggregate values from the sample database 104 (e.g., a smaller database), according to one embodiment. Bootstrapped estimation techniques, such as, but not limited to, case resampling, Bayesian bootstrap, and/or parametric bootstrap, could also be employed to obtain more accurate results, according to one embodiment. The estimation module 216 may also forgo applying the heuristical estimation algorithm and report to the user 110 that the aggregate values from the sample database 104 are based upon random samples and are likely to differ from aggregate values from the original database 102, according to one embodiment.

In one embodiment, a presentation algorithm 214 that optimally determines which characteristics to present to the user 110 may be refined based in a further query based on a monitored behavior of the user in interacting with at least one of the initial query and the subsequent query in the query editor.

The completion marker module 208 records the decision of the user 110 that either the initial query 106 and/or some subsequent query 108 is ready to run against the original database given the current data profile 116, according to one embodiment. The completion mark can be stored in the metadata 118 of the data profile 116 and/or separately in some form of persistent storage, according to one embodiment.

The sample database generator module 206 constructs and/or modifies a sample database 104, according to one embodiment. The sample database 104 is used by the auto-complete algorithm module 200, the result set profiler module 202, the profile visualizer module 204, the sample database generator module 206, the completion marker module 208, the sampling module 218, and the estimation module 216, according to one embodiment. The sample database generator module 206 constructs and/or modifies the sample database 104 by either using the sampling module 218 to acquire data from the original database 102 and/or by directly copying data from the original database 102 in the case of small data storage units (e.g. tables), according to one embodiment.

The auto-complete algorithm module 200 provides change candidates through the user interface of the query editor 100 to the user 110 applicable to the initial query 106 and/or subsequent query 108 using sample database 104 information from the sample database generator module 206 and data profile 116 information from the result set profiler module 202, according to one embodiment. The auto-complete algorithm module 200 provides change candidates sorted by relevance to complete the current portion (e.g. attribute, table, or schema names, query keywords, predicates, expressions) of the initial query 106 and/or subsequent query 108, according to one embodiment. The incomplete portion of the initial query 106 and/or subsequent query 108 may include, but not limited to, prefixes of physical names of data objects, or prefixes of logical names of data objects. Data objects include, but are not limited to, attributes, tables, schema, predicates, expressions, attribute values. In one embodiment, the auto-complete module 200 relies on a compressed index structure (e.g., a compressed trie) to work well within memory restrictions of modern browers to provide a highly responsive behavior. The auto-complete module 200 may also be implemented on the server side without concerns about memory restrictions.

Figure 3:
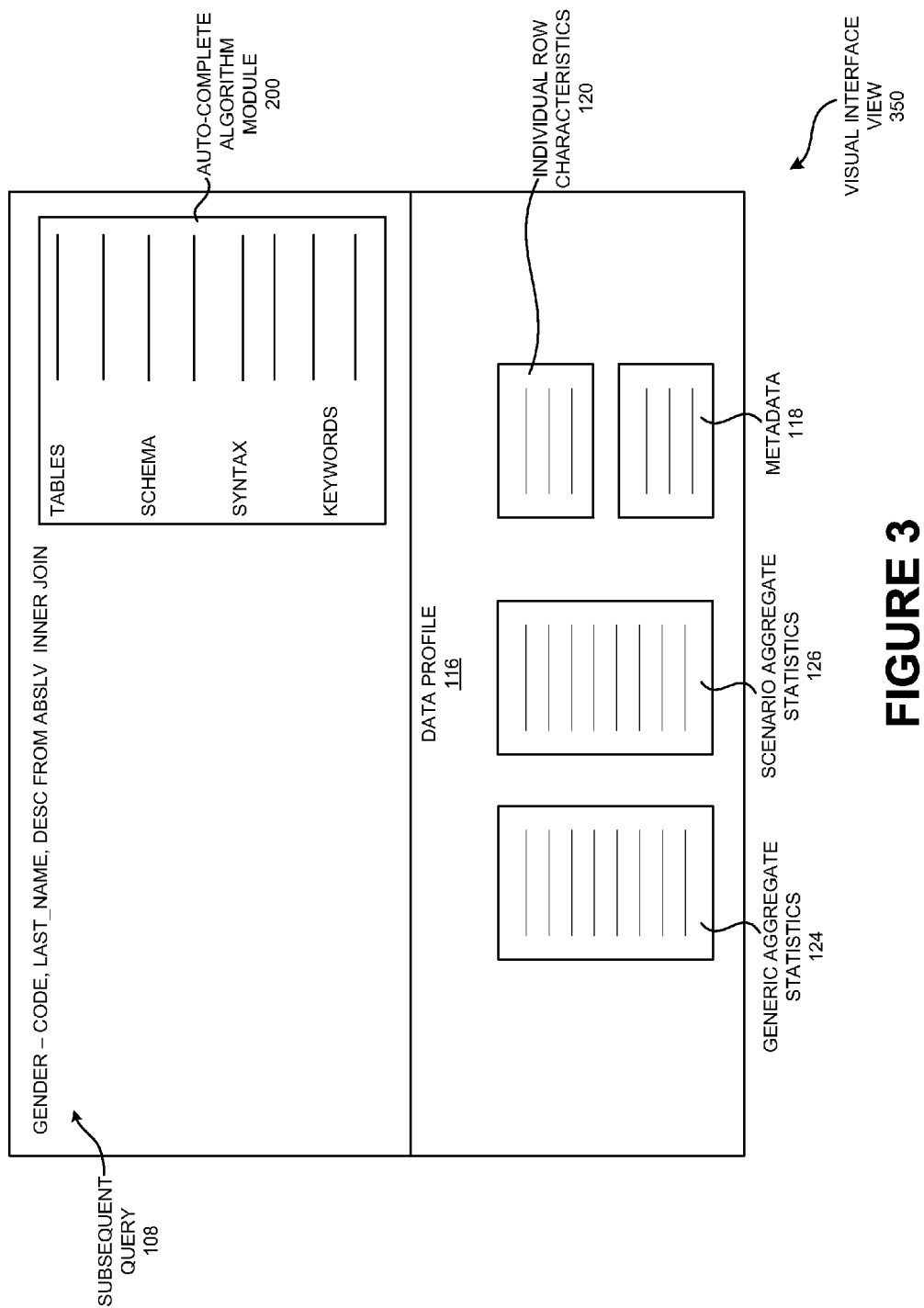
FIG. 3 is a representation of the visual interface view, according to one embodiment.

FIG. 3 is a representation of the visual interface view 350, according to one embodiment. The user 110 may experience this view on the data processing system 130 through a local application window, a command line interface, and/or a web browser, according to one embodiment. The visual interface view 350 presents the user 110 with the current data profile 116 consisting of metadata 118, row characteristics 120, generic aggregate statistics 124, and scenario aggregate statistics 126, according to one embodiment. The interface view 350 also presents the subsequent query 108, according to one embodiment. The auto-complete algorithm module 200 monitors changes in the subsequent query 108 and offers possible changes to the query, according to one embodiment.

Figure 4:
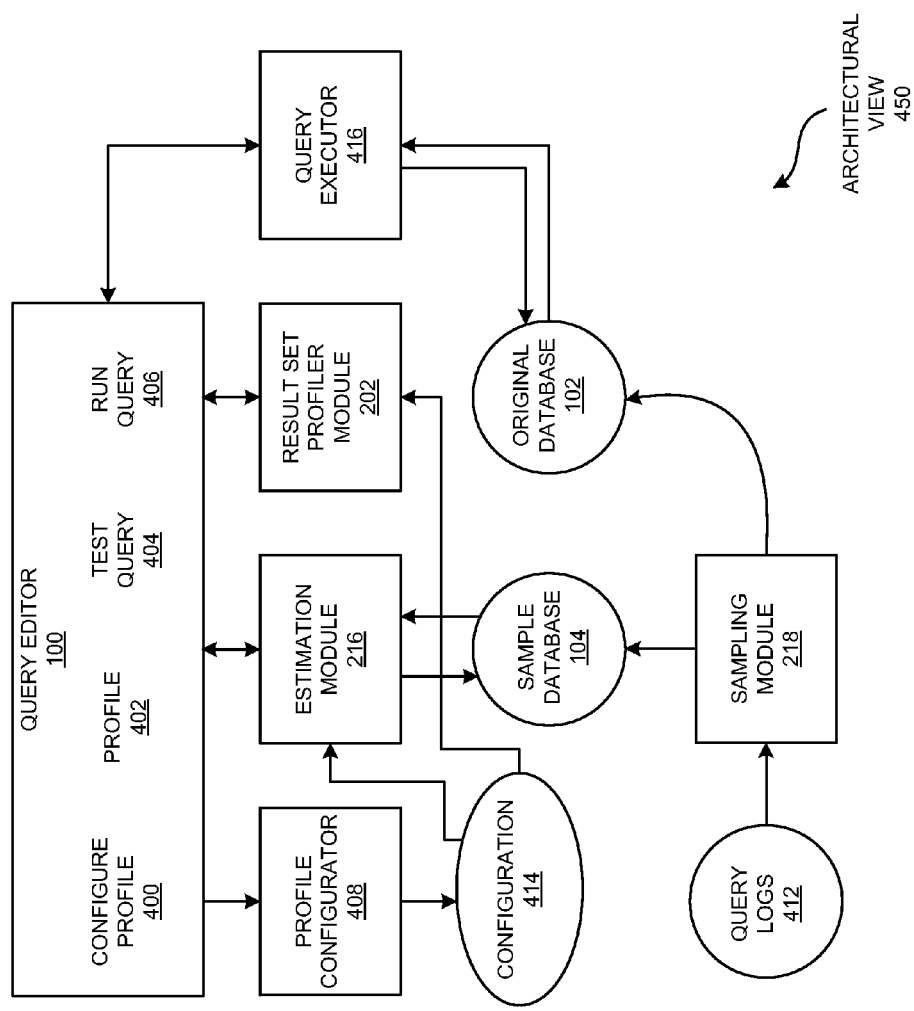
FIG. 4 is an architectural view of a system for assisted query formation, validation, and result previewing, according to one embodiment.

FIG. 4 is an architectural view 450 of a system for assisted query formation, validation, and result previewing, according to one embodiment. The query editor 100 allows the user 110 the choice of several activities including, but not limited to, configure profile 400, profile 402, test query 404, and/or run query 406, according to one embodiment. When the user 110 configures the profile, the query editor 100 instantiates, and/or communicates with, a profile configurator 408 that will make user 110 directed changes to a configuration 414, according to one embodiment. The profile configurator 408 allows the user 110 to change settings that affects the construction of the data profile 116 such as queries for scenario aggregate statistics 126, according to one embodiment. The configuration 414 may be stored as a structured text file using the INI format, extensible markup language (XML), JSON, YAML, and/or other configuration file format, and/or within some data storage system such as a relational database (e.g. MySql®, Oracle®, and/or SQLite®), key-value and/or document-stores (e.g. Cassandra®, CouchDB®, and/or MongoDB®), and/or a persistent data structure such as a Java® HashMap serialized to a file, according to one embodiment.

The sampling module 218 utilizes query logs 412 to seed the sample database 104 with representative data randomly sampled from original database 102, according to one embodiment.

The estimation module 216 retrieves parameters from the configuration 414 to facilitate the estimation of generic aggregate statistics 124 and scenario aggregate statistics 126 of the original database 102 based upon the initial result set 112 and/or subsequent result sets 114 collected from the sample database 104, according to one embodiment.

The run query 406 activity initiates the query executor 416 to send the initial query 106 and/or subsequent query 108 to the original database 102. Results from this query are collected and presented to the user 110 through the user interface of the query editor 100, according to one embodiment.

Figure 5:
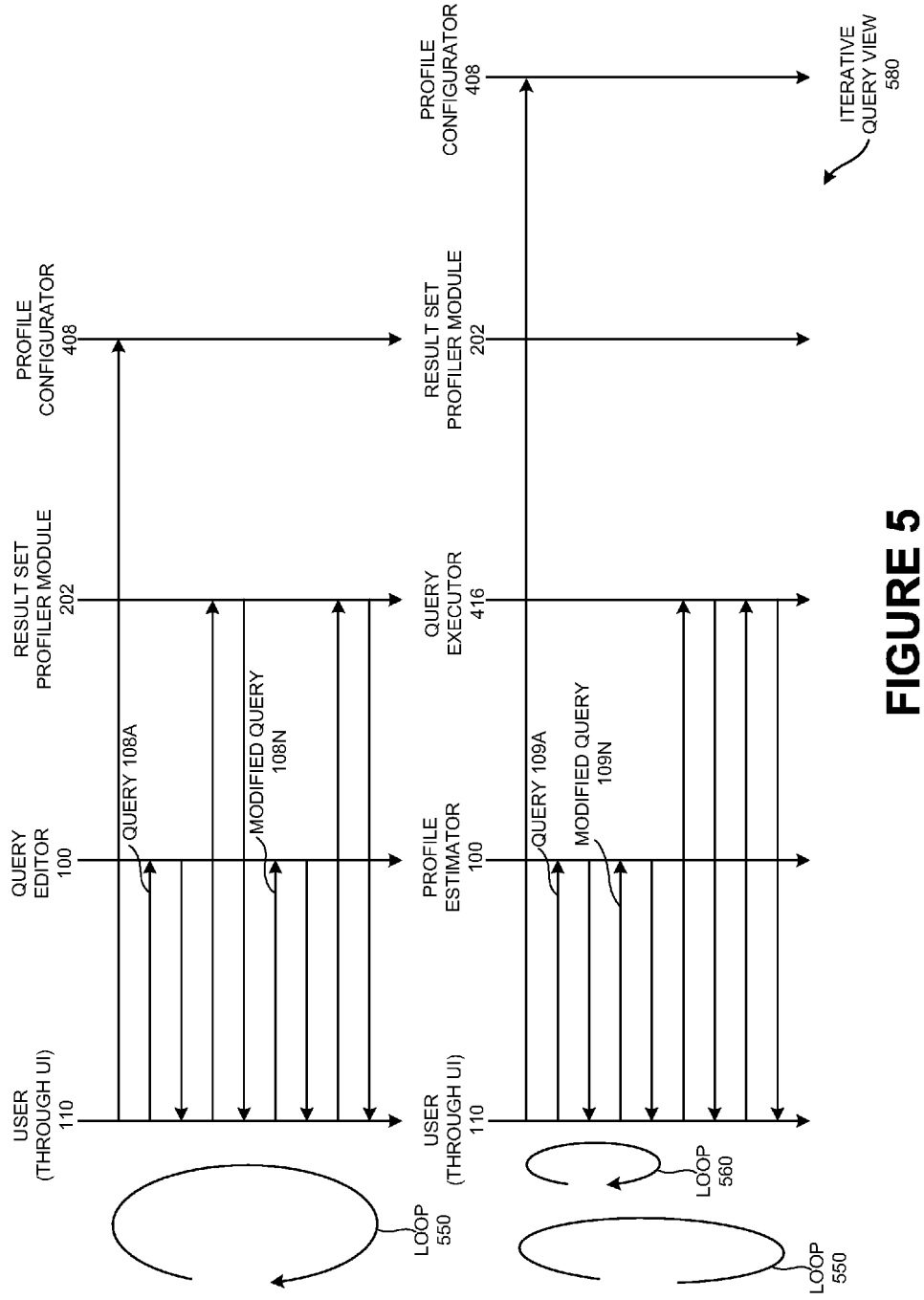
FIG. 5 is an iterative query view 580 operational flow of a user iteratively refining a query with aggregation (e.g. SUM, COUNT, AVERAGE) using the profile estimator, query executor result set profiler 202, and the profile configurator, according to one embodiment.

The top half of FIG. 5 shows the operational flow of a user 110 iteratively refining a query without aggregation (e.g. SUM, COUNT, AVERAGE) using the query editor 100, result set profiler module 202, and the profile configurator 408, according to one embodiment. User 110 first configures the system through the profile configurator 408, informing the system of expectations and limitations of the target query, according to one embodiment. The user 110 provides an initial query 106A to the query to the query editor 100. Query 108A may and/or may not be complete as the auto-complete algorithm module may have suggested changes, according to one embodiment. Once the user 110 is satisfied with the query 108A, the query 108A is sent to the result set profiler, according to one embodiment. The user 110 examines the data profile 116 for the query 108A, after which the user 110 will either finish because the query data profile indicates successful query, and/or the user 110 will alter query 108A into query 108N and repeat the loop 550, according to one embodiment. The bottom half of FIG. 5 shows the operational flow of a user 110 iteratively refining a query with aggregation (e.g. SUM, COUNT, AVERAGE) using the profile estimator, query executor 416 result set profiler module 202, and the profile configurator 408, according to one embodiment. User 110 first configures the system through the profile configurator 408, informing the system of expectations and limitations of the target query, according to one embodiment. The user 110 will start with a query 109A and send it to the query editor 100 (e.g., a profile estimator) which responds with an estimated data profile 116, according to one embodiment. The user 110 will repeatedly construct a modified query 109N while the estimated data profile 116 returned by the profile estimator is not satisfactory to the user 110 (loop 560), according to one embodiment. At which point the user 110 sends the query to the query executor 416 which produces a data profile 116, according to one embodiment. If this data profile 116 is satisfactory, the user 110 is finished, otherwise the process is repeated as indicated by loop 570, according to one embodiment.

Figure 6:
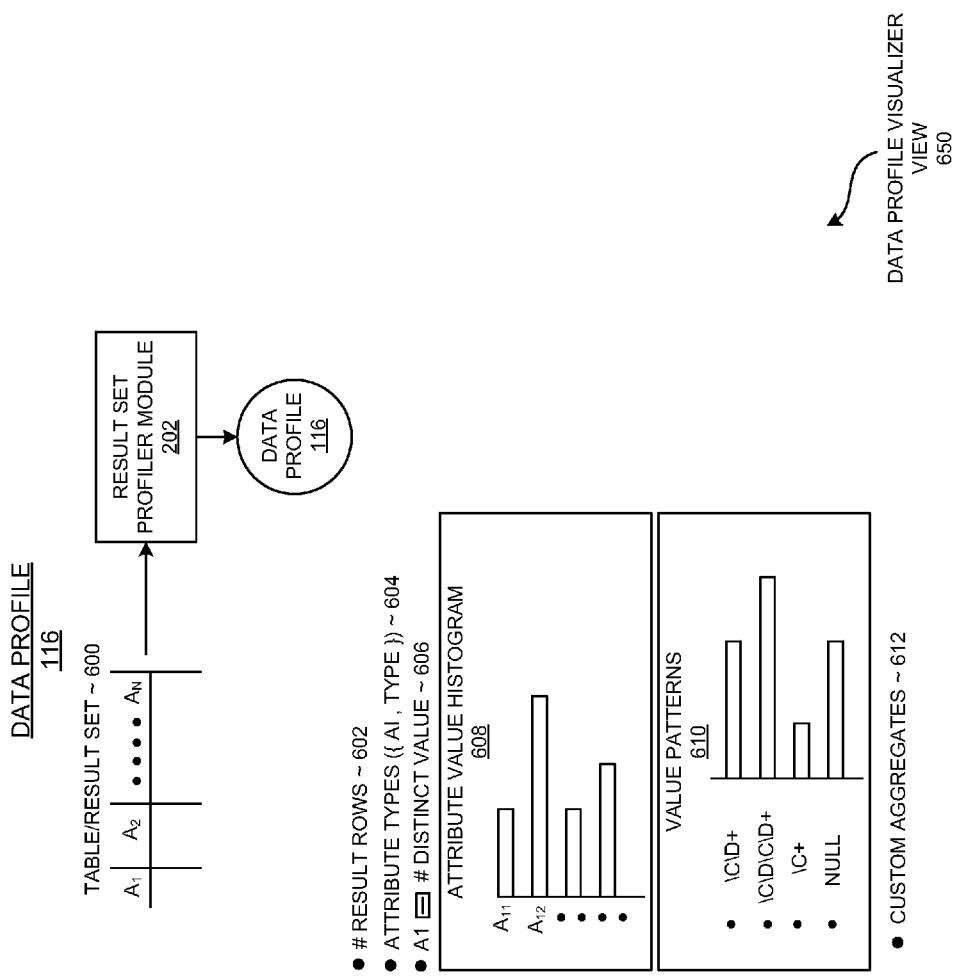
FIG. 6 shows the data profile visualizer view, according to one embodiment.

FIG. 6 shows the data profile visualizer view 650, according to one embodiment. The user 110 may experience this view on the data processing system 130 through a local application window, a command line interface, and/or a web browser, according to one embodiment. The result set profiler module 202 takes a results set 600 and extracts metadata 118, individual row characteristics 120, and aggregate statistical characteristics 122 from the result set 112 (or 114) and places this information in the data profile 116, according to one embodiment. The data profile visualizer view presents the contents of the profile to the user 110, according to one embodiment. The data profile visualizer view 650 displays number of result rows 602, attribute types 604, number of distinct attributes for each value 606, an attribute value histogram 608 illustrating the distribution of values for each attribute, and value patterns 610 showing the distribution of string values represented by regular expressions, as well as custom aggregates 612, according to one embodiment.

Individual row characteristics 120 are presented to the user 110 to validate the semantic correctness of the initial query 106 and/or any subsequent query 108 and consist of a randomly chosen subset of the initial result set 112 and/or subsequent result set 114, according to one embodiment.

Figure 7:
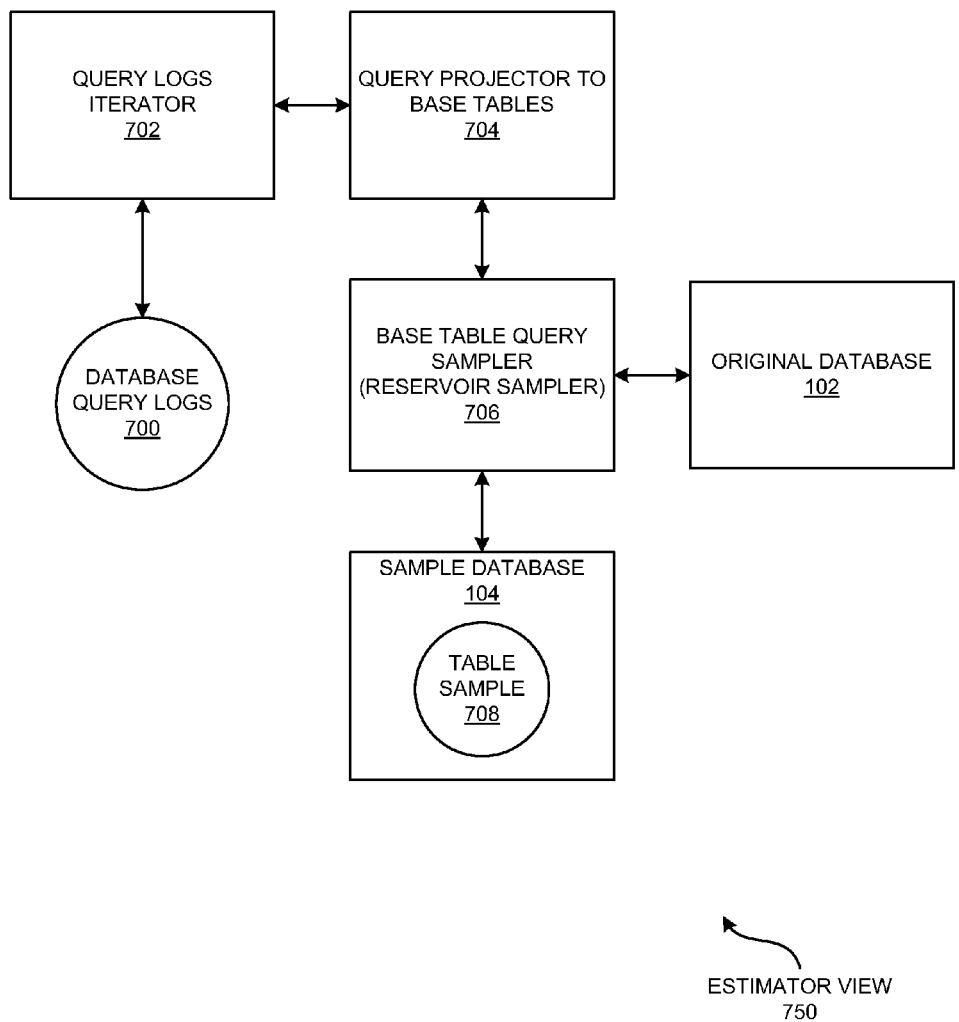
FIG. 7 shows the estimator view of the database sampler, according to one embodiment.

FIG. 7 shows the estimator view 750 of the data profile visualizer view 650, according to one embodiment. A query logs iterator 702 reads database query logs 700, sending relevant query information to the query projector to base tables 704, according to one embodiment. The query projector to base tables 704 collects conditions associated with each of the base tables, consolidates, and then passes the conditions on to the base table query sampler 706, according to one embodiment. The base table query sampler 706 uses these conditions to drive a reservoir sampling algorithm 210 to fill table samples 708 in the sample database 104, if storage units are large, otherwise it may copy the storage unit entirely, according to one embodiment.

Figure 8:
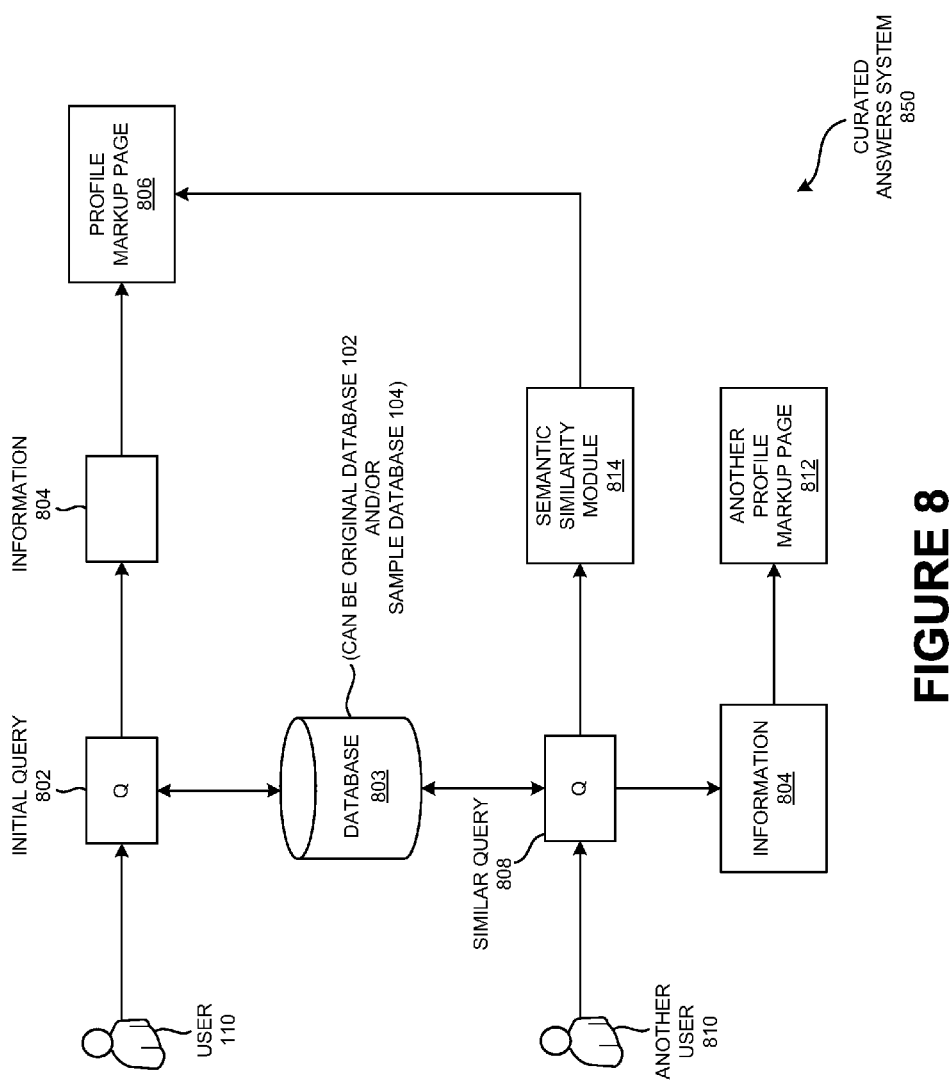
FIG. 8 provides a block diagram of the curated answers system 850, in one embodiment.

FIG. 8 provides a block diagram of the curated answers system 850. In one embodiment, a user 110 creates an initial query 802 against a database 803, which can be the original database 102 and/or the sample database 104. The information 804 from this initial query 106 is stored in the profile markup page 806, in one embodiment. Another user 810 creates a similar query 808 against a database 803, which can be the original database 102 and/or the sample database 104. The semantic similarity module 814 compares the initial query 802 and the similar query 808 and then annotates the profile markup page 806 of the initial query 102, in one embodiment. The semantic similarity module 814 determines the similarity of queries from the semantic similarity of query constituents including, but not limited to, tables, attributes, and predicates, found by exact and/or inexact match, in one embodiment. The information 804 collected from the similar query 808 is stored in another profile markup page 812, in one embodiment.

Figure 9:
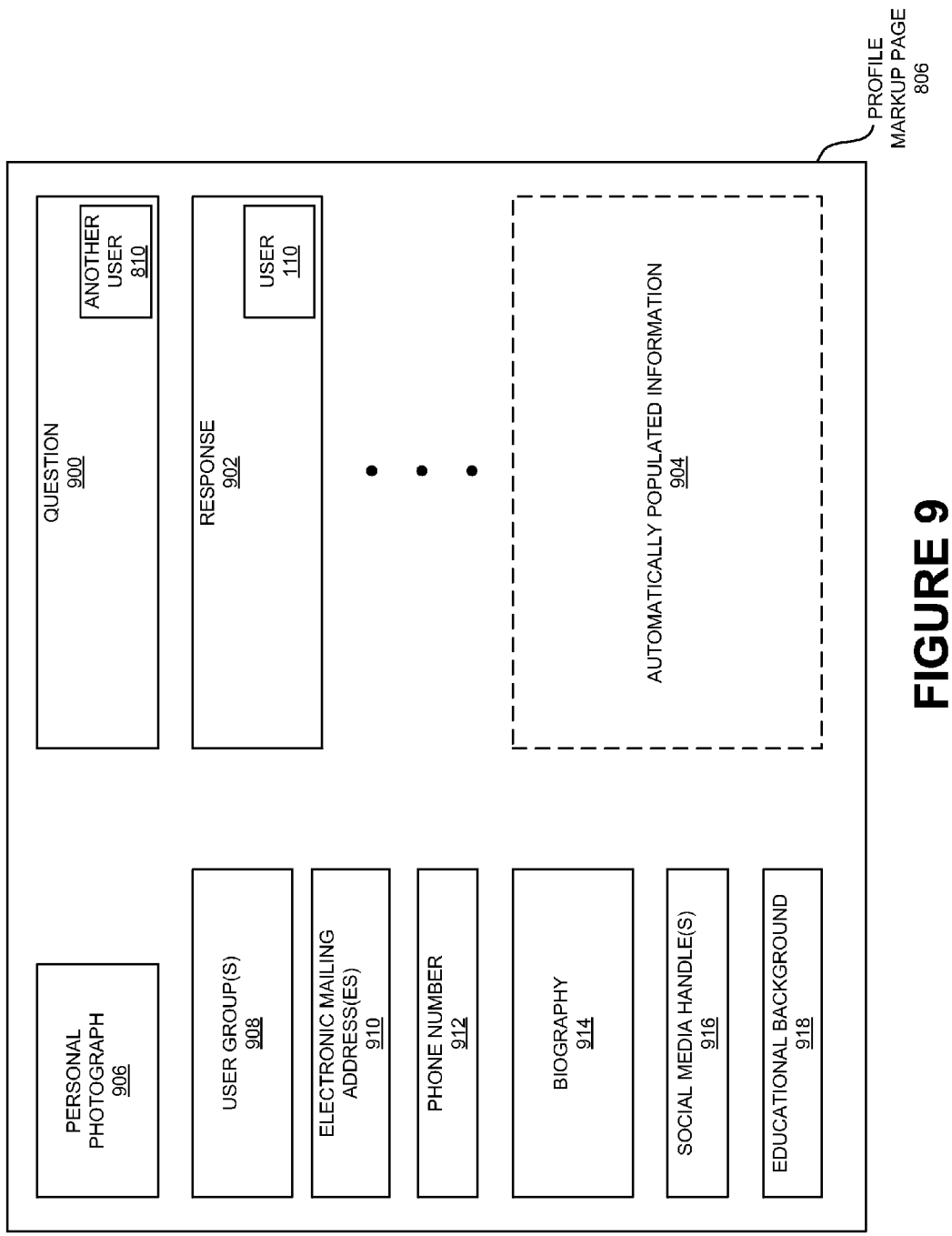
FIG. 9 provides a block diagram of the profile markup page 806 corresponding to a user 110, in one embodiment.

FIG. 9 provides a block diagram of the profile markup page 806 corresponding to a user 110. The profile markup page 806 comprises of a personal photograph 906 of the user 110, user group(s) 908 the user 110 belongs to, the electronic mailing addresses 910 of the user 110, the phone number 912 of the user 110, a biography 914 of the user, social media handles 916 of the user 110 (e.g. Facebook®, Linkedin®, and StackOverflow®), and educational background 918 of the user 110, a question 900, zero or more responses 902, and automatically populated information 904, in one embodiment. The question 900 contains annotation indicating another user 910 who asked the question 900, in one embodiment. Each response 902 contains annotation indicating a user 110 responded to the question 900, in one embodiment.

Automatically populated information 904 includes, but is not limited to, popular tables, popular attributes, co-queried attributes in a table, related tables, joinable columns, join predicates, and relevant filters for each table, in one embodiment.

Figure 10:
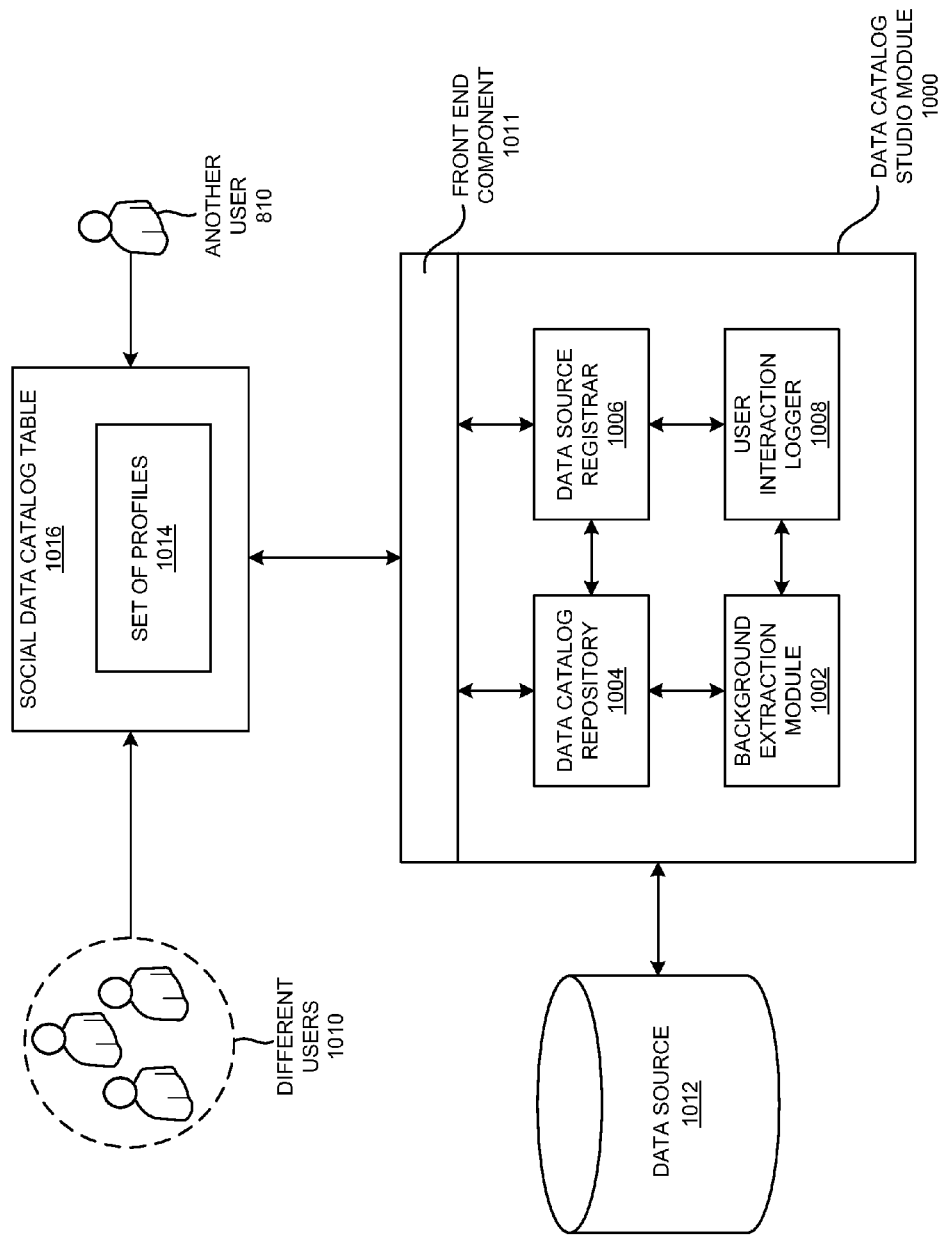
FIG. 10 provides a block diagram to the data catalog studio module 1000, in one embodiment.

FIG. 10 provides a block diagram to the data catalog studio module 1000, in one embodiment. Different users 1010 contribute to a set of profiles 1014 stored in a social data catalog table 1016, in one embodiment. A social data catalog table 1016 contains metadata 118, usage information of data sources 1012, and automatically populated information 904, in one embodiment. The metadata 118 consists of schema names, tables within schemas, name and datatype of attributes, primary keys constraints (e.g. uniqueness and nullability), functional dependencies (e.g. the revenue column is the product of the quantity and price columns), indexes, and foreign keys, in one embodiment. Another user 810 may view the set of profiles 1014, in one embodiment. The data catalog studio module 1000 consists of a front end component 1011, the data catalog repository 1004 and data source registrar 1006, the background extraction module 1002, and user interaction logger 1008, in one embodiment. The front end component 1011 provides access to the data catalog repository 1004 and data source registrar 1006, in one embodiment. The data catalog studio module 1000 stores and retrieves information from a data source 1012, in one embodiment.

A data catalog repository 1004 stores the social data catalog, data objects and/or information about the data object, and returns information about the social data catalog and/or data objects, in one embodiment. The data catalog repository 1004 may also update the social data catalog, data objects, and/or information about data objects, in one embodiment. The background extraction module 1002 automatically profiles, locates, extracts and/or associates documentation and/or query logs of the user 110 and/or other users 810, in one embodiment. The user interaction logger 1008 monitors and/or records the activity of the user 110 while interacting with the front end component 1011, in one embodiment.

Figure 11:
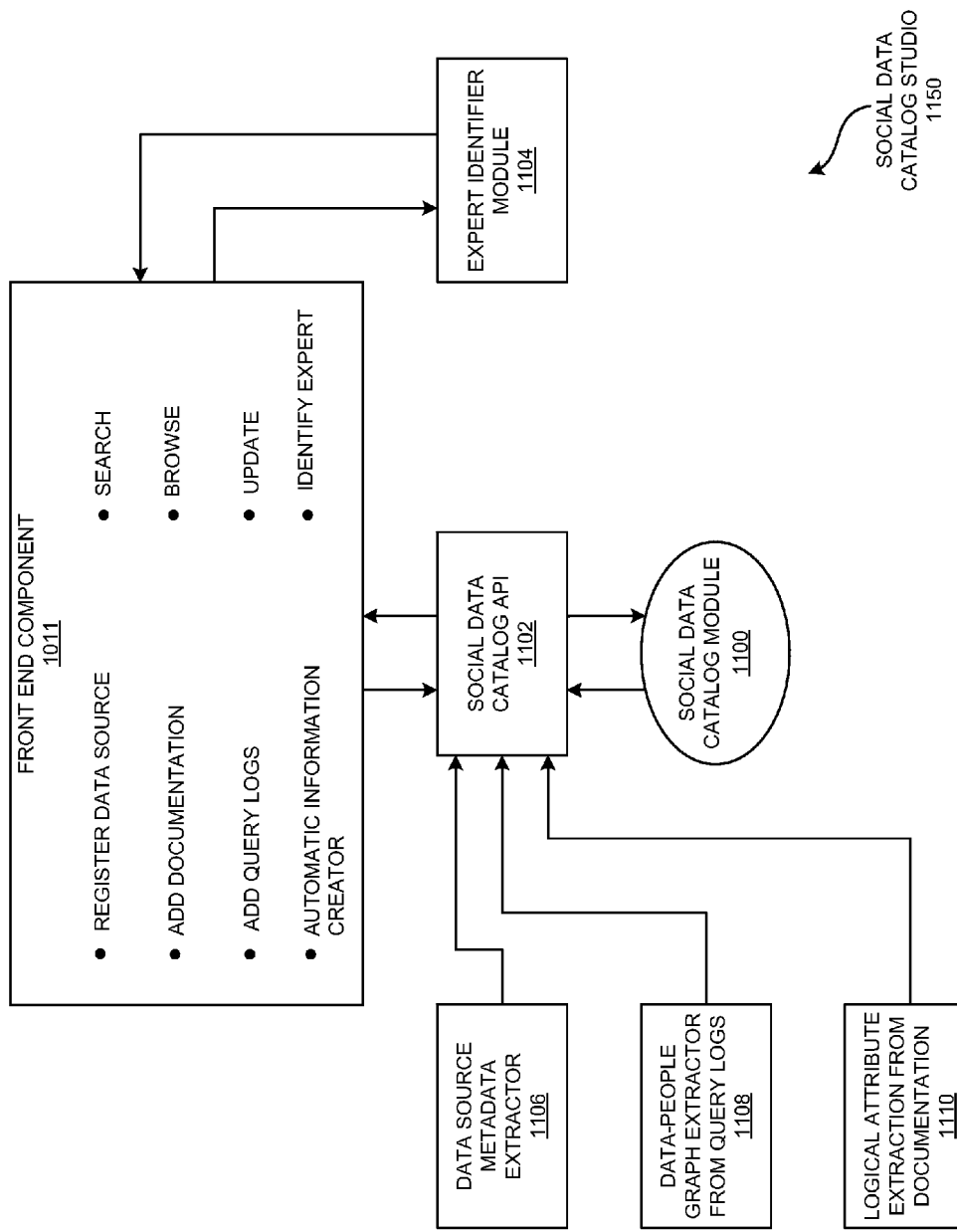
FIG. 11 provides a block diagram of the social data catalog studio 1150, in one embodiment.

FIG. 11 provides a block diagram of the social data catalog studio 1150, in one embodiment. The front end component 1011 provides the user 110 an interface for performing several action including, but not limited to, register data source, add documentation, add query logs, search, browse, update, and identify expert, in one embodiment. The front end component 1011 translates user requests into social data catalog API 1102 requests as necessary, in one embodiment. The social data catalog API 1102 also receives requests from the data source metadata extractor 1106, data-people graph extractor from query logs 1108, and logical attribute extraction from documentation 1110, in one embodiment. The social data catalog API 1102 passes these requests to the social data catalog module 1100, in one embodiment. The front end component 1011 also sends requests and receives responses from the expert identifier module 1104, in one embodiment.

Figure 12:
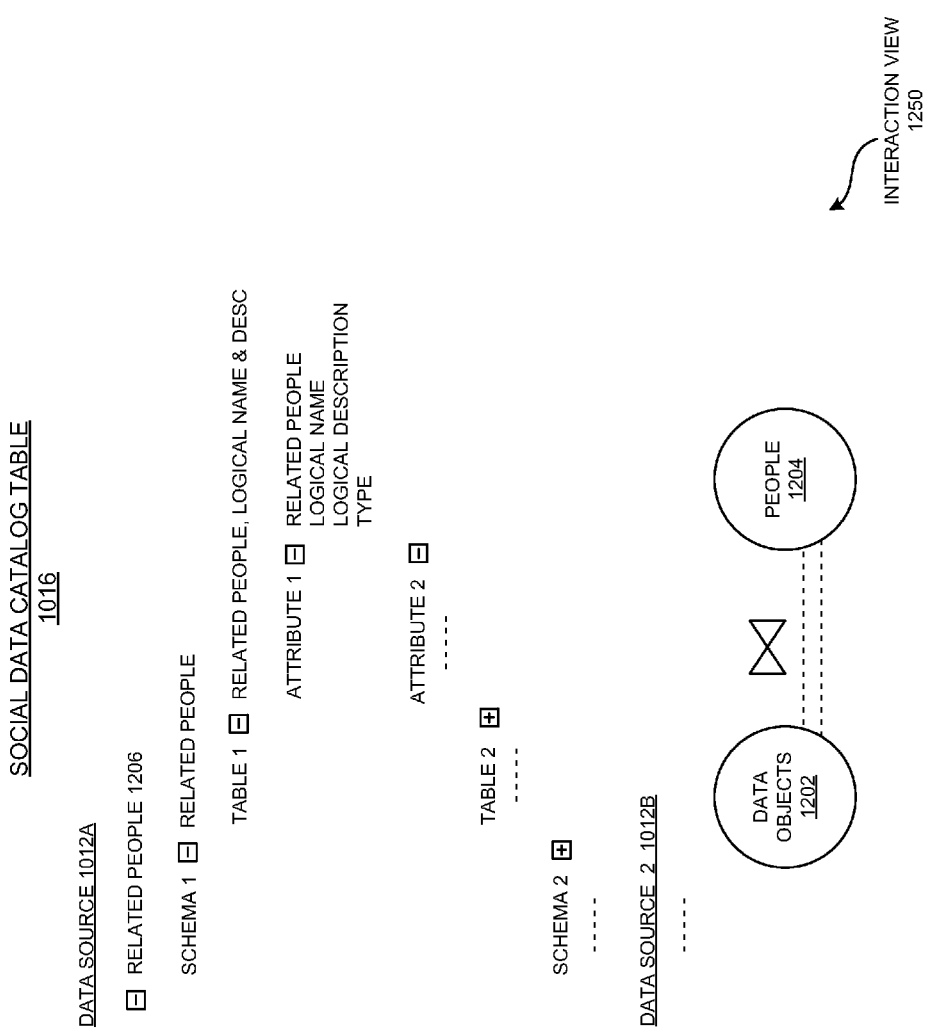
FIG. 12 presents an interaction view 1250 of the social data catalog table 1016 as displayed to the user 110 whose purpose is to store relationships between data objects 1202 and people 1204, in one embodiment.

FIG. 12 presents an interaction view 1250 of the social data catalog table 1016 as displayed to the user 110 whose purpose is to store relationships between data objects 1202 and people 1204, in one embodiment. The social data catalog table 1016 contains information regarding many data sources 1012, such a relational database, a document store, or key-value store, in one embodiment. A data source 1012A will show related people 1206 who are experts regarding the data source 1012A, in one embodiment. A data source 1012A may have several schemas, tables, and attributes, each of which will show related people, logical name, logical description, and type, in one embodiment. This structure will be presented for data source 2 1012B, as well as others, in one embodiment.

Figure 13:
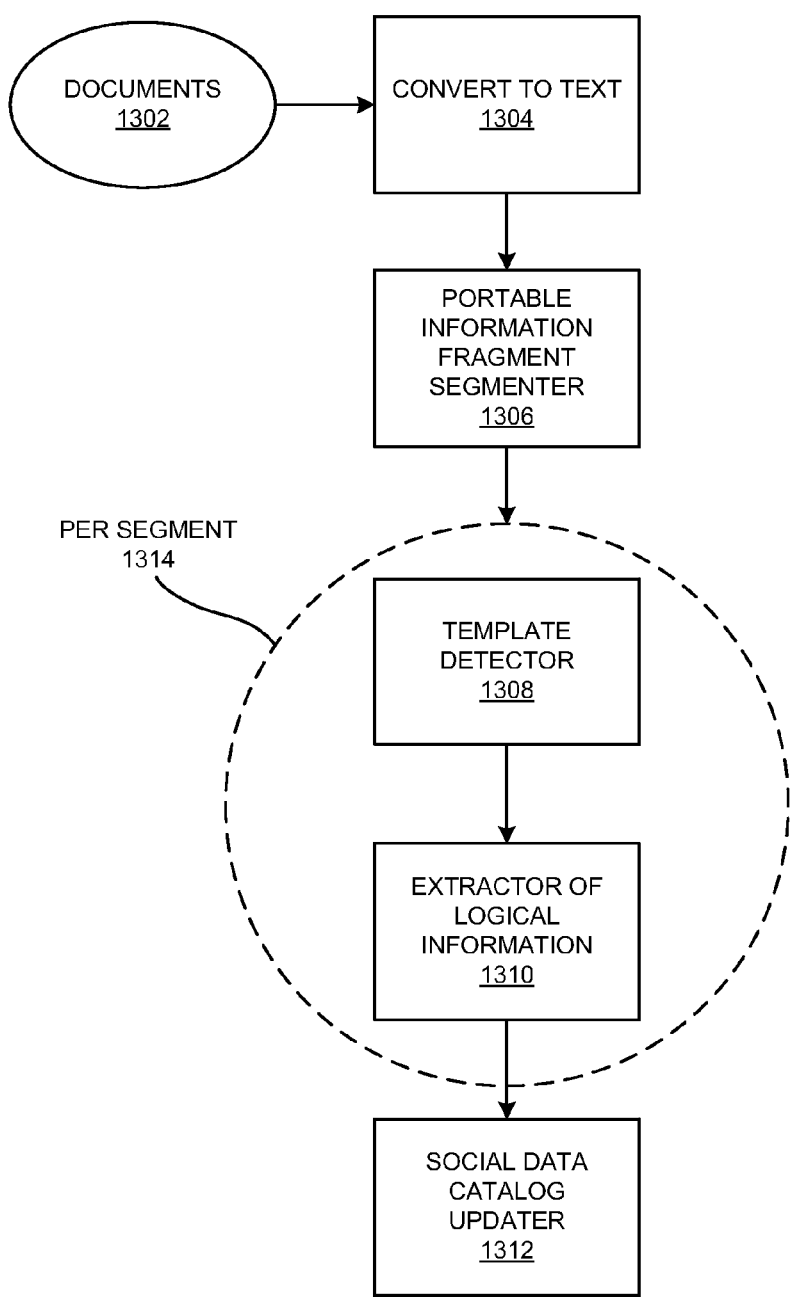
FIG. 13 is a block diagram of logical information extraction from documentation view 1350, in one embodiment.

FIG. 13 is a block diagram of logical information extraction from documentation view 1350, in one embodiment. The extraction process begin with documents 1302, of arbitrary formats (e.g. Microsoft Word®, PDF®, and/or HTML), in one embodiment. All documents 1302 pass through a convert to text 1304 process, in one embodiment. The resulting text documents pass to a portable information fragment segmenter 1306, in one embodiment. A template detector 1308 identifies useful information components within a segment and the extractor of logical information 1310 packages combines these components into composite facts, per segment 1314, in one embodiment. The template detector 1308 employs physical metadata (e.g. the set of attributes within a table) to construct templates that identify locations within documents 1302 where attributes are described, in one embodiment. The locations of the descriptions along with analysis to determine patterns of the html tag or DOM structure between identified locations enables it to accurately extract logical title and description from unstructured documentation, in one embodiment. The composite facts are sent to the social data catalog updater 1312 to be associated with the appropriate data objects 1202, in one embodiment.

Figure 14:
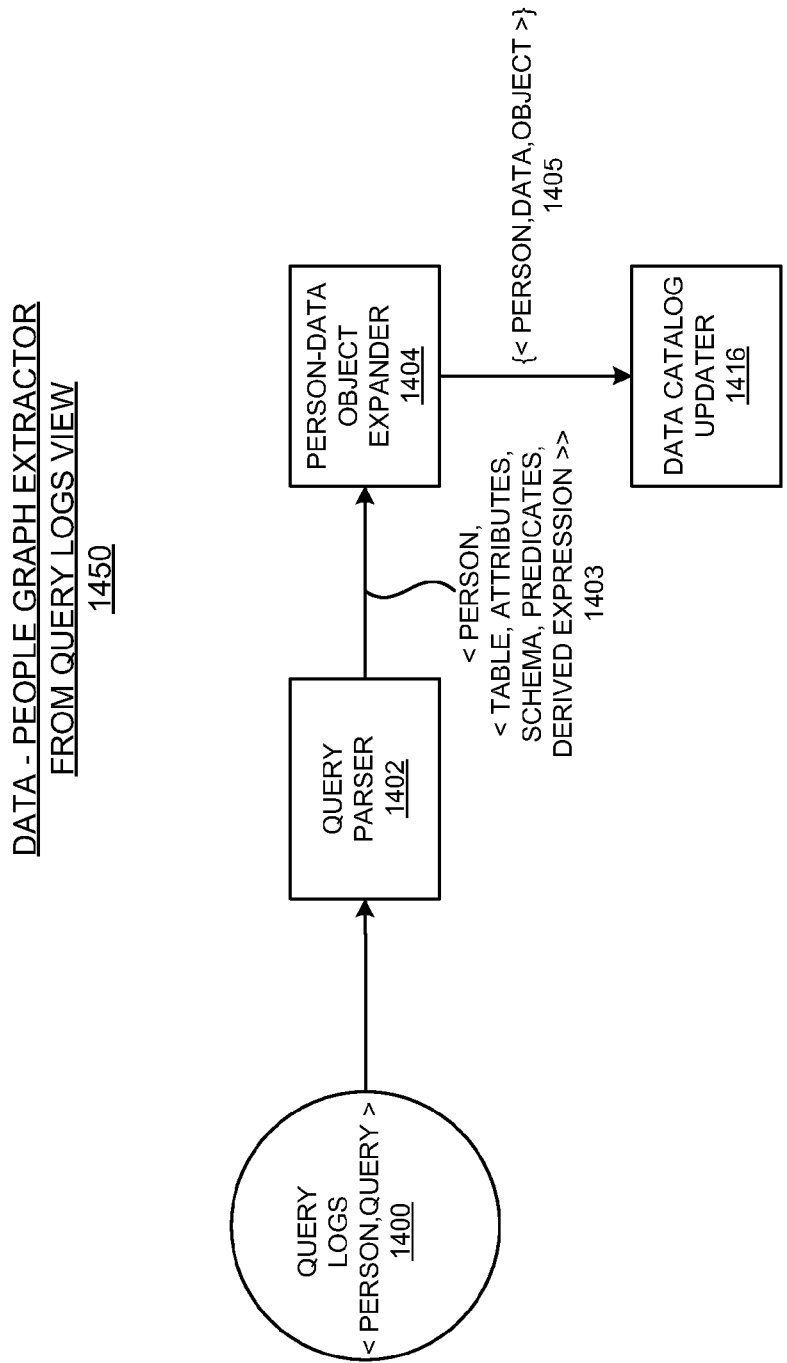
FIG. 14 is a block diagram of data-people graph extractor from query logs view 1450, in one embodiment.

FIG. 14 is a block diagram of data-people graph extractor from query logs view 1450, in one embodiment. Query logs 1400 containing tuples of the form <person, query> are passed to a query parser 1402, in one embodiment. The query parser 1402 translates a <person, query> tuple into a <person, <table, attributes, schema, predicates, derived expressions>> 1403 tuple, in one embodiment. The person-data object expander 1404 uses the <table, attributes, schema, predicates, derived expressions> 1403 to construct a set of <person, data object> 1405 tuples that are sent to the data catalog updater 1416, in one embodiment.

Figure 15:
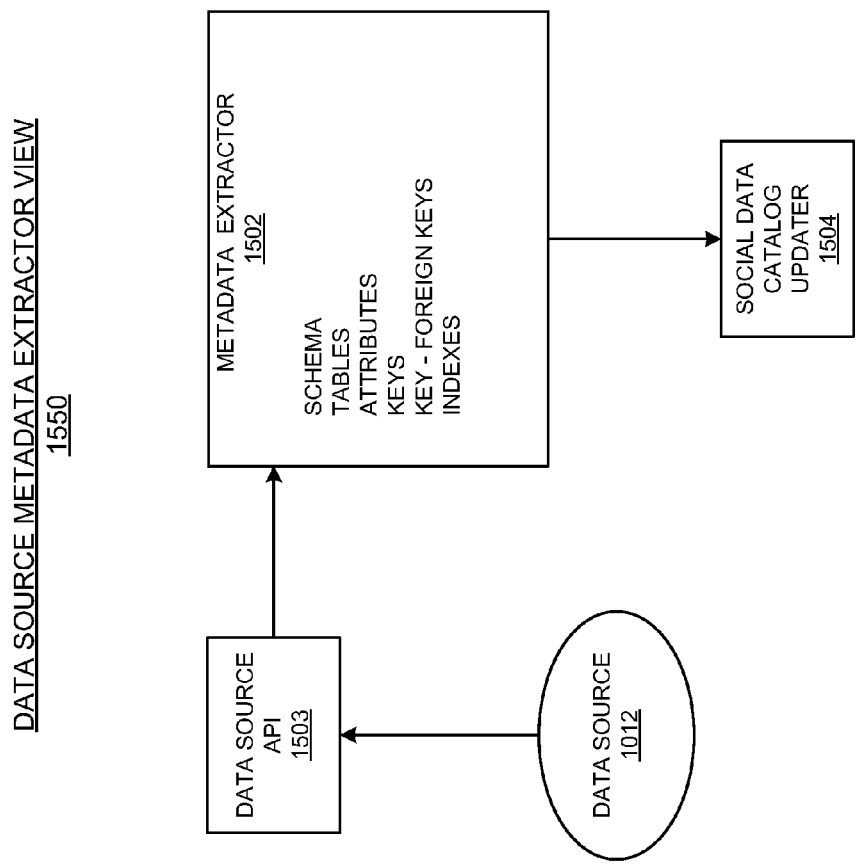
FIG. 15 is a block diagram of the data source metadata extractor view 1550, in one embodiment.

FIG. 15 is a block diagram of the data source metadata extractor view 1550, in one embodiment. The metadata extractor 1502 pulls schema, tables, attributes, keys, foreign keys, indexes and any other relevant information from the data source 1012 through the data source API 1503, in one embodiment. The extracted information is then sent to the social data catalog updater 1504, in one embodiment.

Figure 16:
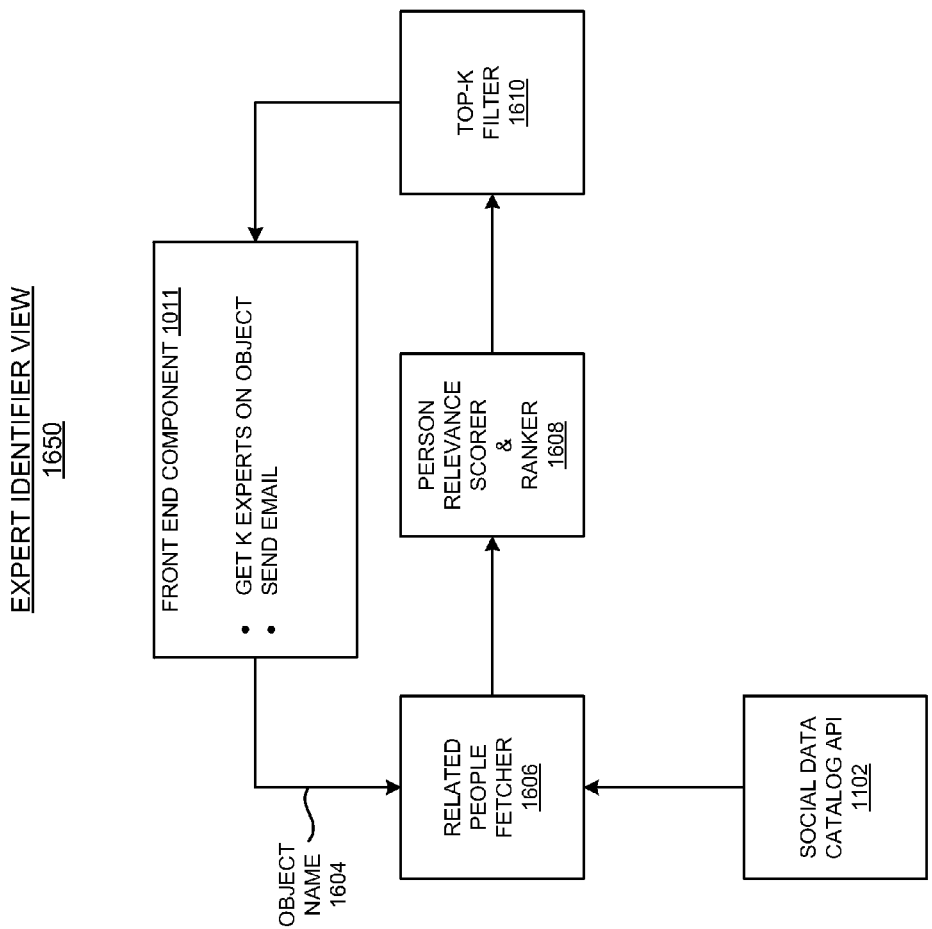
FIG. 16 is a block diagram of the expert identifier view 1650, in one embodiment.

FIG. 16 is a block diagram of the expert identifier view 1650, in one embodiment. The front end component 1011 allows the user 110 to get some number, k, experts on an object and send email to those experts, in one embodiment. The related people fetcher 1606 takes an object name 1604 and produces a list of candidate experts by accessing the social data catalog API 1102, in one embodiment. The person relevance scorer & ranker 1608 orders the candidate experts by relevance to the object name 1604, in one embodiment. Features used by the person relevance scorer & ranker 1608 include, but are not limited to, authors of documentation about a data source, people who registered a given data source, users who have queried a data object, previous responses on requests for similar data objects, in one embodiment. The top-k filter 1610 keeps the top k of the ranked expert candidates and sends them back to the front end component 1011, in one embodiment.

Figure 17:
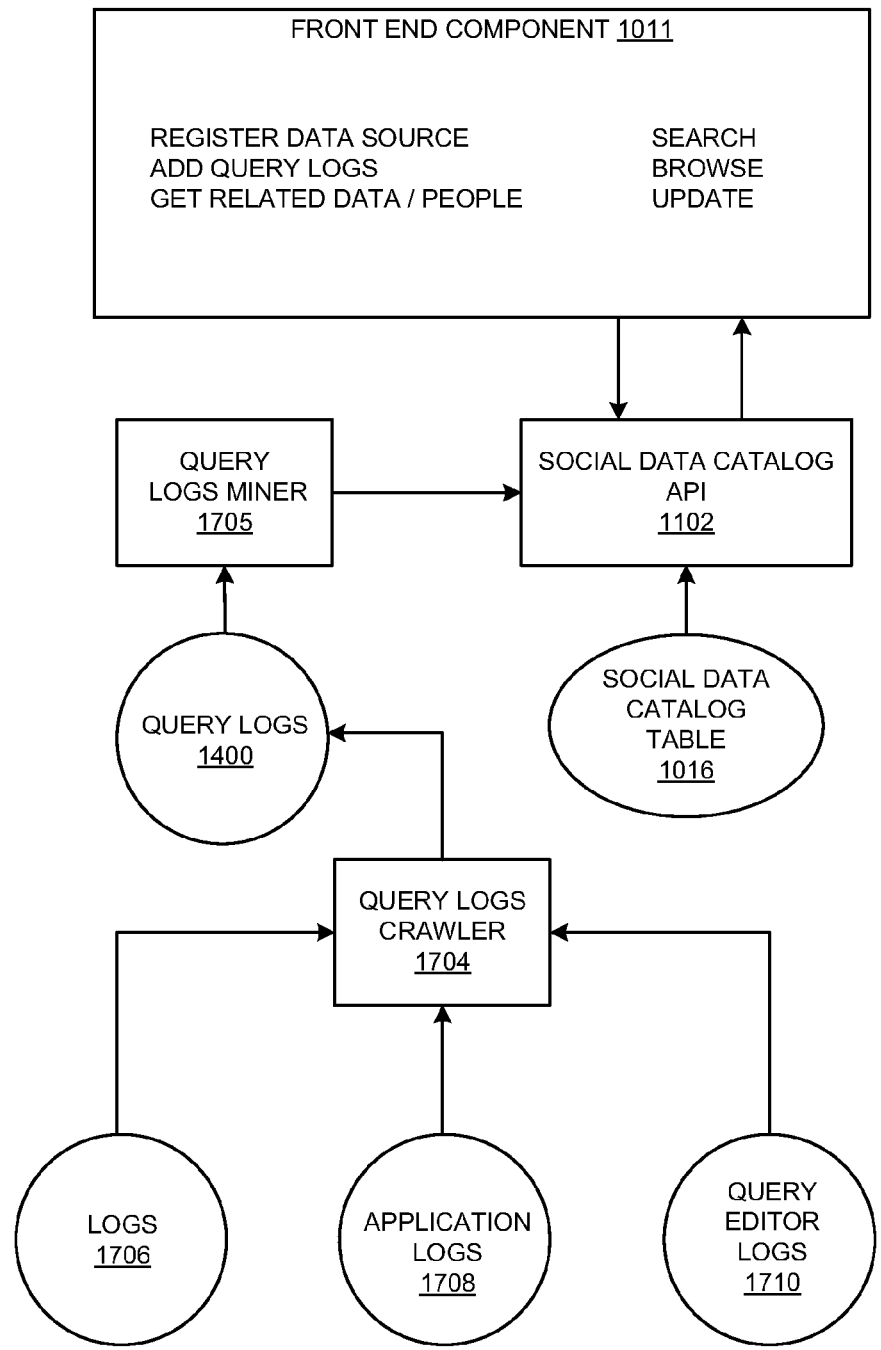
FIG. 17 is a block diagram of the social data catalog studio view 1750, in one embodiment.

FIG. 17 is a block diagram of the social data catalog studio view 1750, in one embodiment. The front end component 1011 allows the user 110 several actions including register data source, add query logs, get related data/people, search, browse, and update, in one embodiment. All these actions are converted into social data catalog API 1102 calls, in one embodiment. The social data catalog API 1102 retrieves information from the social data catalog table 1016, in one embodiment. The search operation matches keywords from titles, descriptions, physical names and values of the data object, in one embodiment.

The query logs crawler 1704 collects several types of logs including, but not limited to, application logs 1708, query editor logs 1710, and logs 1706, in one embodiment. These query logs are passed on to the query logs miner 1705 that updates the social data catalog table 1016 through the social data catalog API 1102, in one embodiment.

Figure 18:
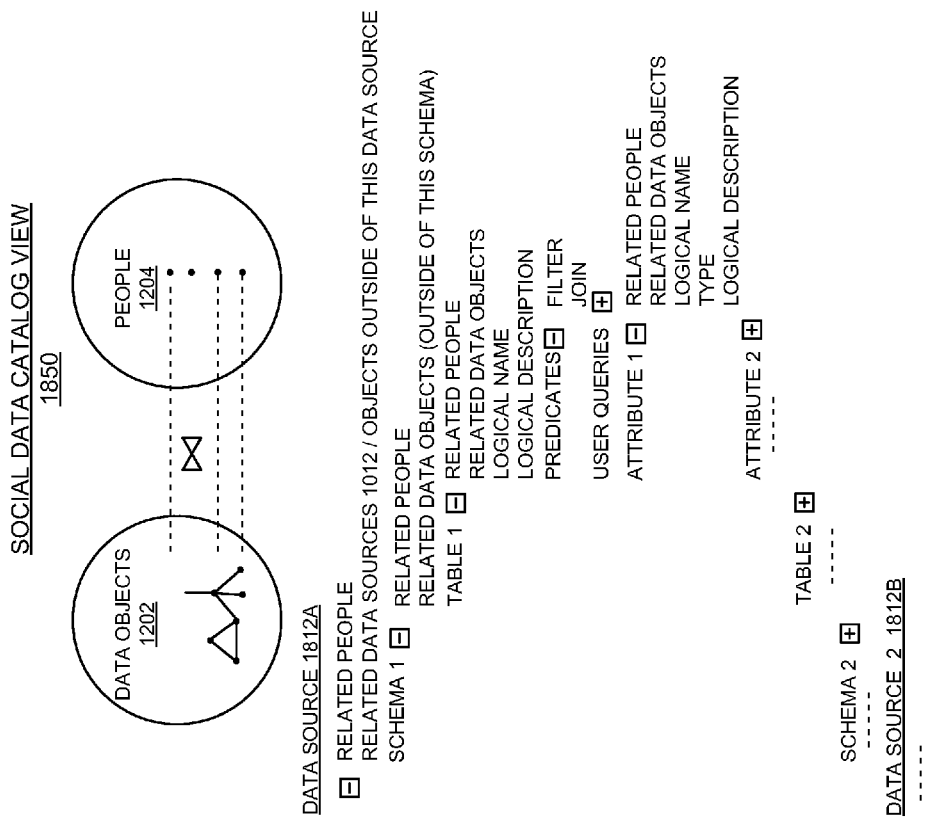
FIG. 18 presents the social data catalog view 1850, in one embodiment.

FIG. 18 presents the social data catalog view 1850, in one embodiment. The social data catalog table 1016 records the many-to-many mapping between data objects 1202 and people 1204 in one embodiment. A data source 1812A will show related people who are experts regarding the data source 1812A and related data sources 1012 and/or objects outside of this data source, in one embodiment. A data source 1812A may have several schemas, tables, predicates (both filter and join), user queries, and attributes, each of which will show related people, related data objects, logical name, logical description, and type, in one embodiment, in one embodiment. This structure will be presented for data source 2 1812B and other data sources, in one embodiment.

Figure 19:
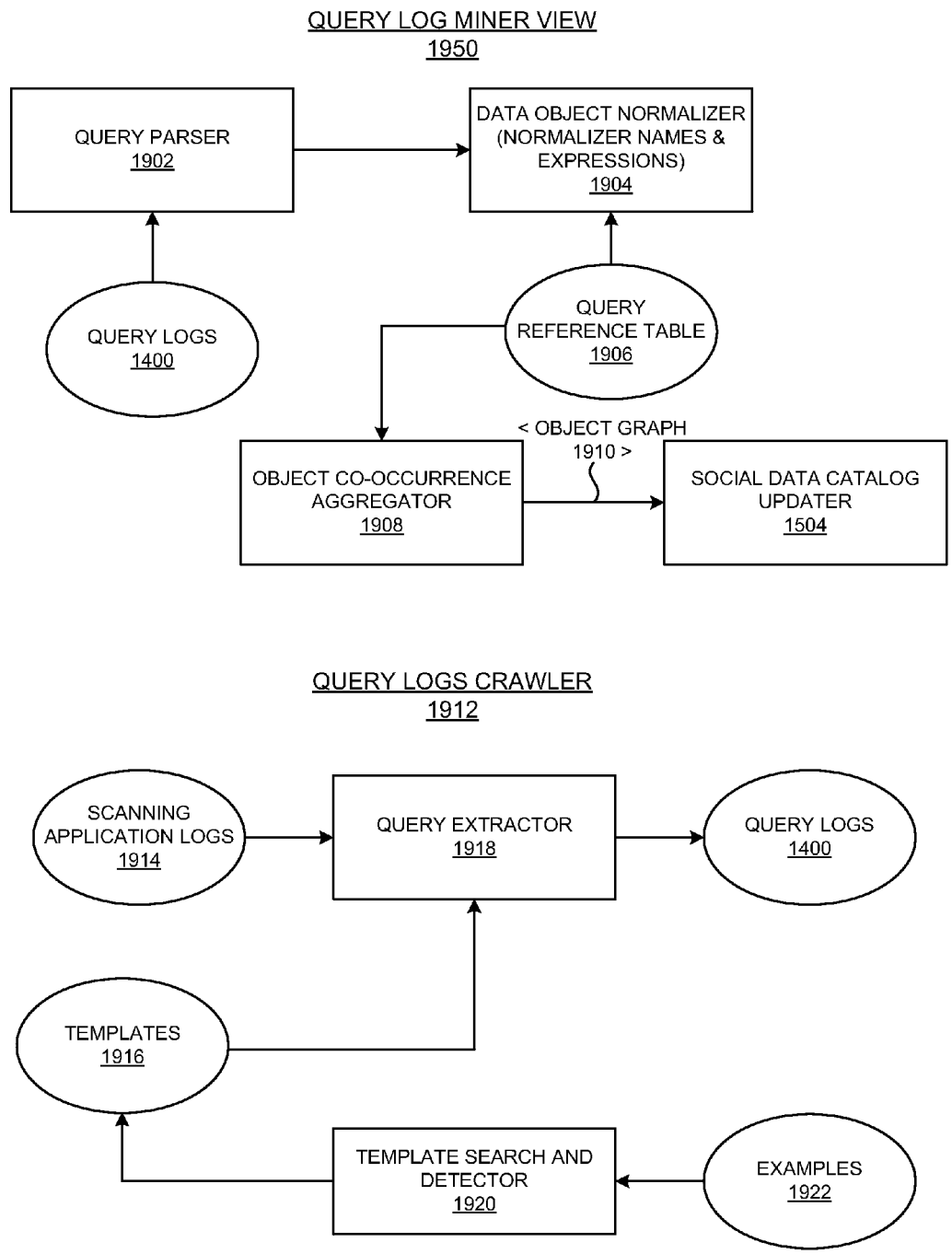
FIG. 19 presents block diagrams of the query log miner view 1950 and the query logs crawler 1912, in one embodiment.

FIG. 19 presents block diagrams of the query log miner view 1950 and the query logs crawler 1912, in one embodiment. The query parser 1902 processes query logs 1400 and extracts schema, table, and attribute information, in one embodiment. The data object normalizer (normalizer names & expressions) 1904 takes schema, table, and attribute identifiers and normalizes them into a consistent naming convention, such as using fully qualified attribute names (e.g. schema.table.attr_name) and stores the normalized object references into a query reference table 1906, in one embodiment. An object co-occurrence aggregator 1908 passes over the query reference table 1906 to construct an object graph 1910, in one embodiment. The object graph is passed to the social data catalog updater 1504 for storage, in one embodiment.

The query logs crawler 1912 constructs query logs 1400 by scanning application logs 1914 with the query extractor 1918, in one embodiment. The query extractor 1918 performs this scanning process using templates 1916 produced by the template search and detector 1920 by analyzing examples 1922 of application log fragments and query signatures (e.g. "SELECT ..."), in one embodiment.

Figure 20:
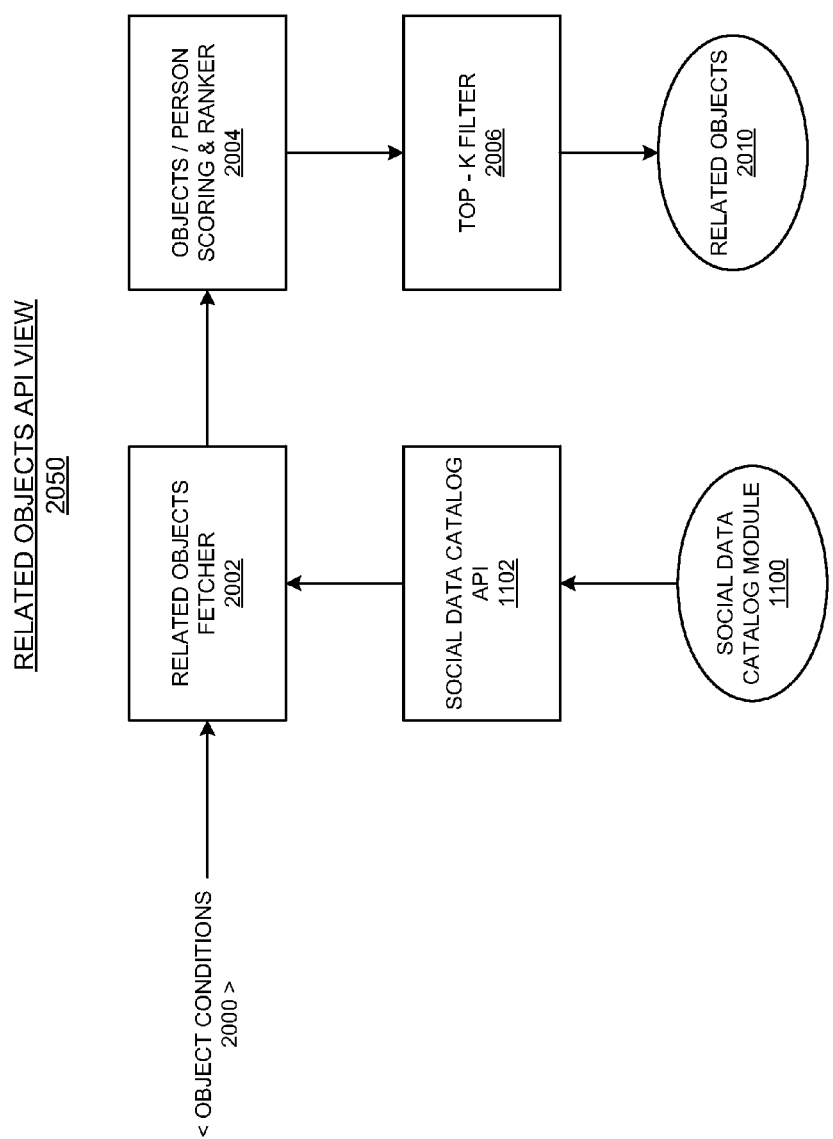
FIG. 20 presents the related objects API view 2050, in one embodiment.

FIG. 20 presents the related objects API view 2050, in one embodiment. Object conditions 2000 are presented to the related objects fetcher 2002 and it generates a set of candidate objects drawn from the social data catalog module 1100 through the social data catalog API 1102, in one embodiment. The candidate objects are rank ordered by the objects/person scoring & ranker 2004 and a top-k filter 2006 extracts the top k scoring objects to produce related objects 2010 for the object conditions 2000, in one embodiment.

Figure 21:
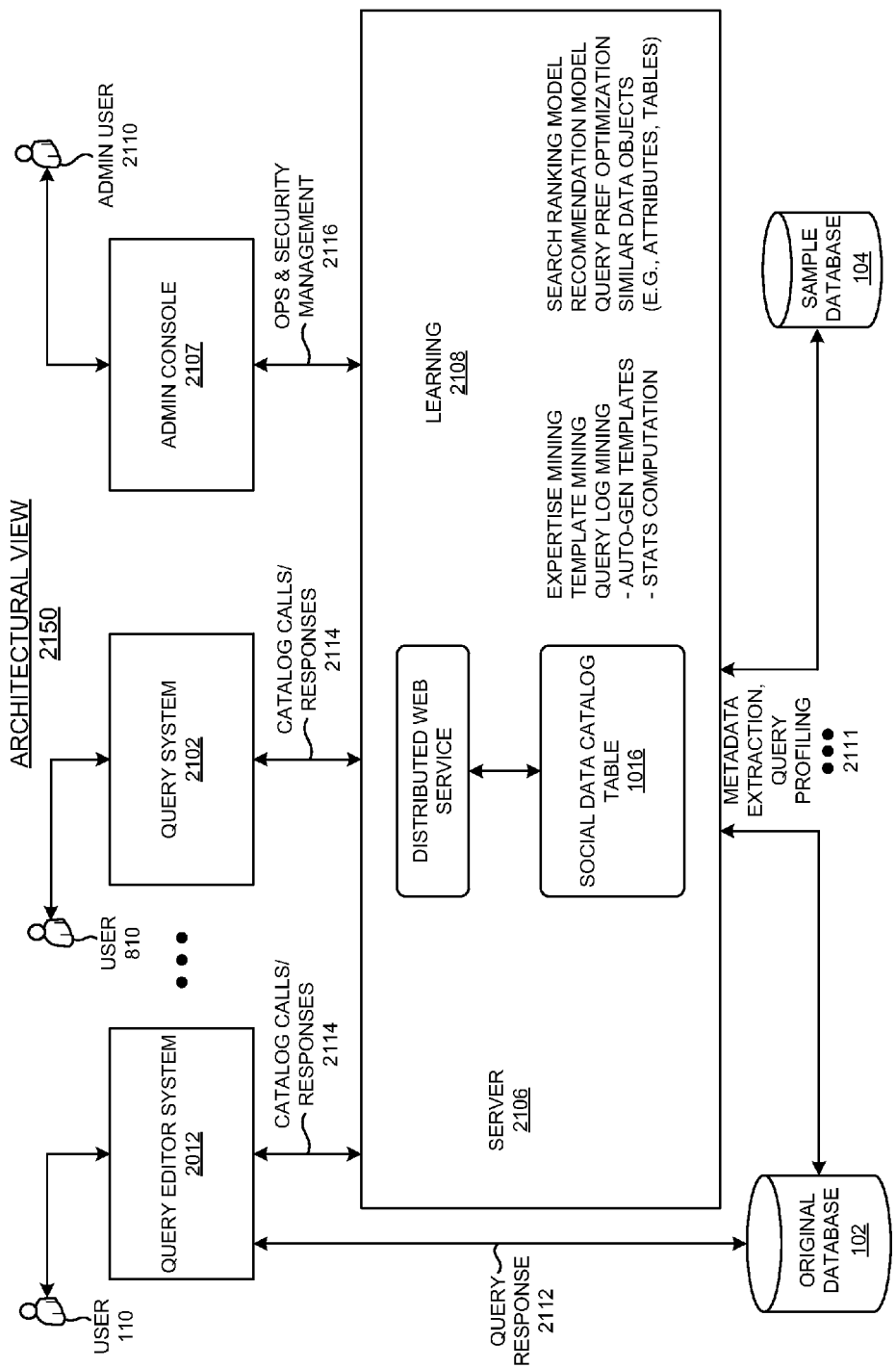
FIG. 21 is a block diagram of the architectural view 2150, in one embodiment.

FIG. 21 is a block diagram of the architectural view 2150, in one embodiment. A user 110 employs the query editor system 2012 running as an application or a web application inside a browser on a local data processing system 130 with its own processor 132 and memory 134. The query system 2102 can query the original database 102 to produce a query response 2112 and/or can initiate catalog calls/responses 2114 to the server 2106. Another user 810, using a local, but different, data processing system 130 with its own processor 132 and memory 134, may employ the query system 2104 to query the original database 102 to produce a query response and/or can initiate catalog calls/responses 2114 to the server 2106. A special admin user 2110 may employ the admin console 2107 to initiate ops and security management 2116 calls and responses. The server 2106 runs on a cluster of data processing systems 130 with its own processor 132 and memory 134, which may be local to or remotely from the query system 2102, the query system 2102, and/or the admin console 2107, in one embodiment. In one embodiment, the server 2106 operates as a web service (may be constructed with Django®, Ruby on Rails®, and/or some other web service framework) on a clustered/distributed computing system (e.g. uWSGI) that accesses the social data catalog table 1016 on a database. The server 2106 communicates with the original database and/or the sample database 104 through operations 2111 including, but not limited to, metadata extraction, query profiling, in one embodiment.

The server 2106 performs several learning 2108 operations including, but not limited to, expertise mining, template mining, query log mining, auto generation of templates, statistics computation, search ranking model, recommendation model, query preference optimization, similar data objects (e.g. attributes, tables), in one embodiment.

Figure 22:
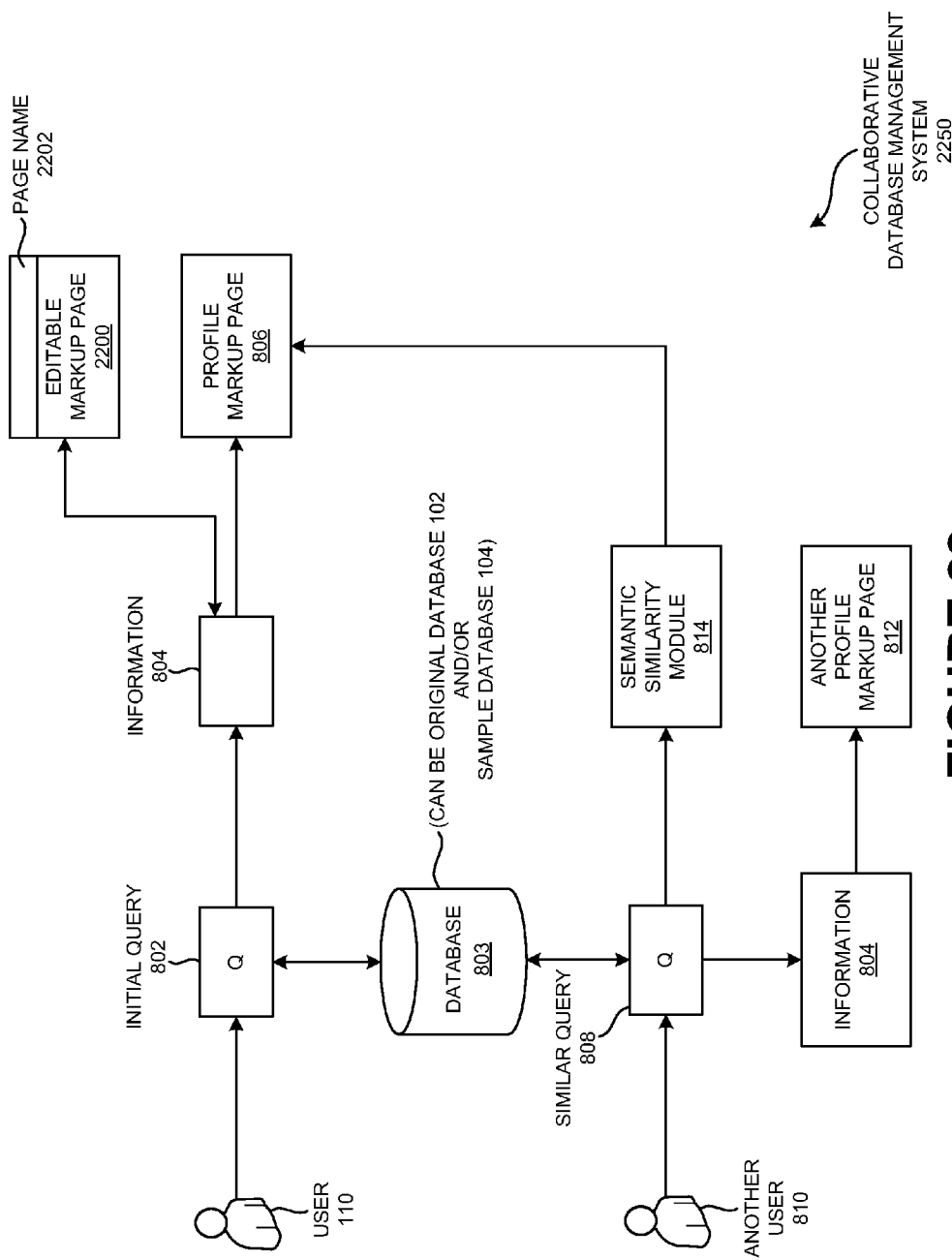
FIG. 22 provides a block diagram of the collaborative database management system, in one embodiment.

FIG. 22 provides a block diagram of the collaborative database management system 2250, in one embodiment. A user 110 creates an initial query 802 against a database 803, which can be either the original database 102 and/or the sample database 104, in one embodiment. The information 804 from this initial query 106 and the editable markup page 2200 is stored in the profile markup page 806, in one embodiment. The editable markup page 2200 is identified by a page name 2202, in one embodiment. Another user 810 creates a similar query 808 against a database 803, which can be the original database 102 and/or the sample database 104, in one embodiment. The semantic similarity module 814 compares the initial query 802 and the similar query 808 and then annotates the profile markup page 806 of the initial query, in one embodiment. The information 804 collected from the similar query 808 is stored in another profile markup page 812, in one embodiment.

Figure 23:
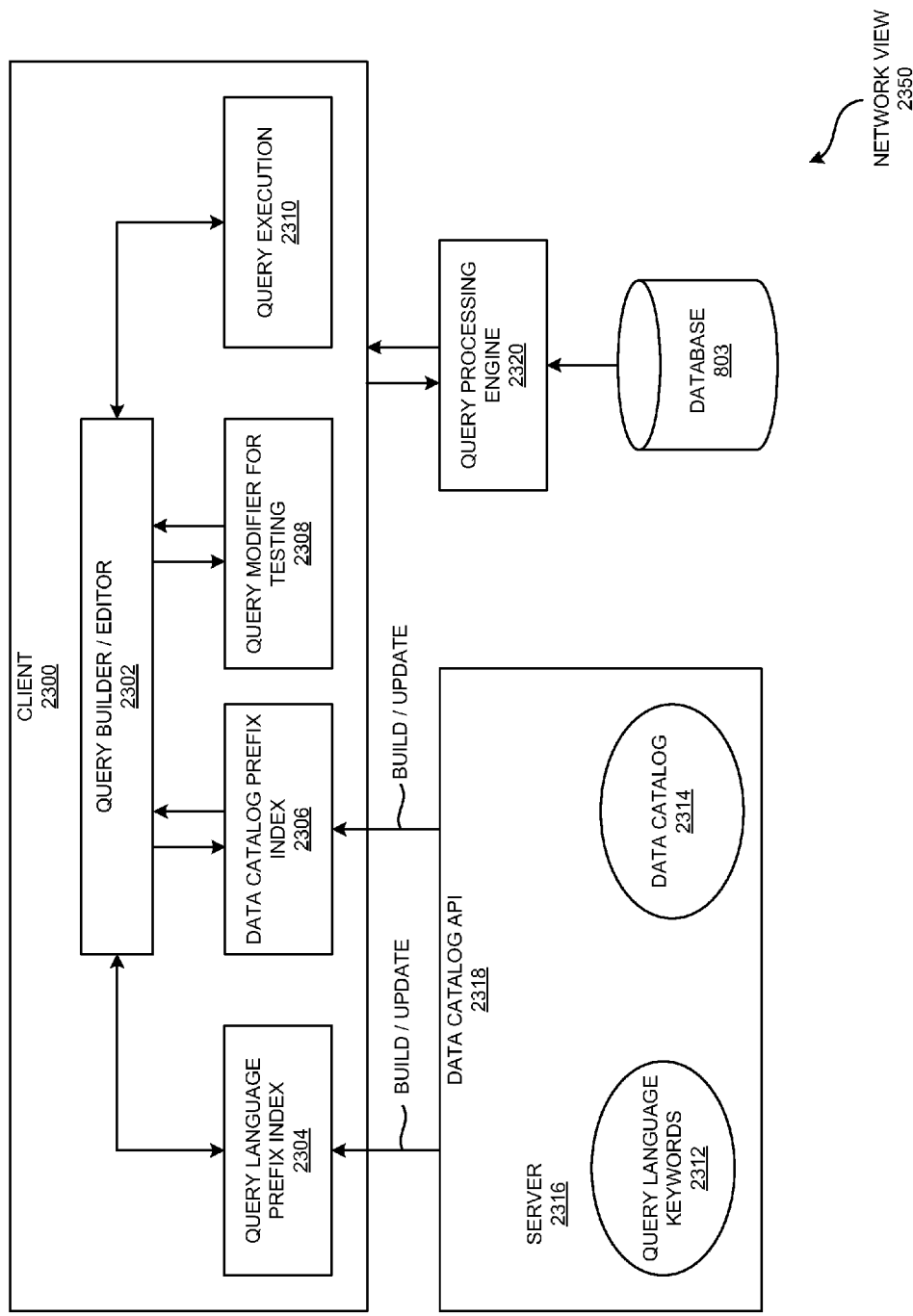
FIG. 23 is a block diagram of the network view 2350, in one embodiment.

FIG. 23 is a block diagram of the network view 2350, in one embodiment. The client 2300 contains a query builder/editor 2302 that interacts with the query language prefix index 2304, the data catalog prefix index 2306, the query modifier for testing 2308, and performs query execution 2310, in one embodiment.

The query language prefix index 2304 and the data catalog prefix index 2306 are built and updated by the server 2316 providing the data catalog API 2318, in one embodiment. The server 2316 stores query language keywords 2312 and a data catalog 2314, in one embodiment.

The client 2300 also interacts with the query processing engine 2320 for the database 803, in one embodiment.

Figure 24:
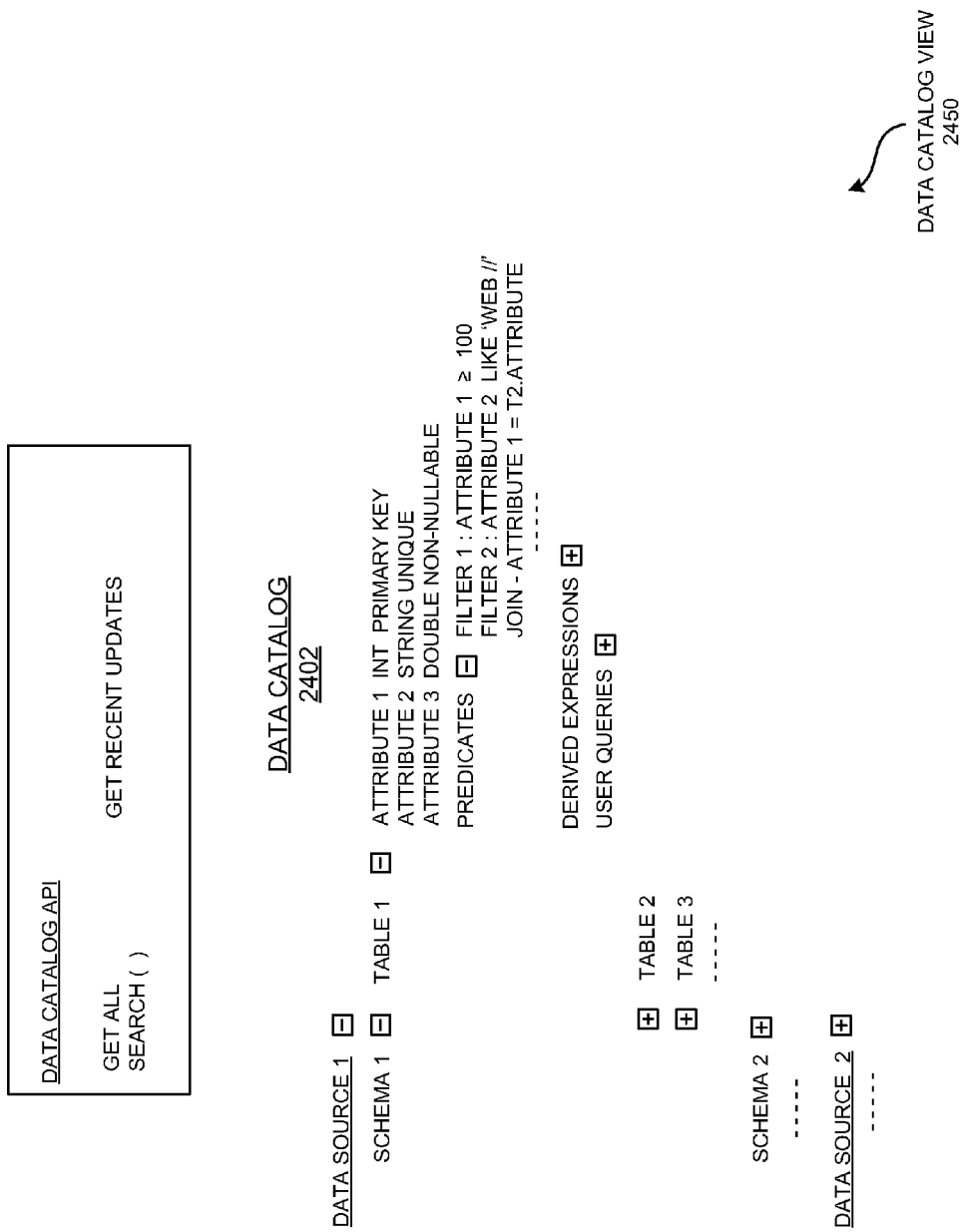
FIG. 24 presents the data catalog view 2450, in one embodiment.

FIG. 24 presents the data catalog view 2450, in one embodiment. The data catalog 2402 includes, but not limited to, information concerning data sources, schemas, tables, attributes, predicates (both filter and join), derived expressions, and user queries, in one embodiment.

Figure 25:
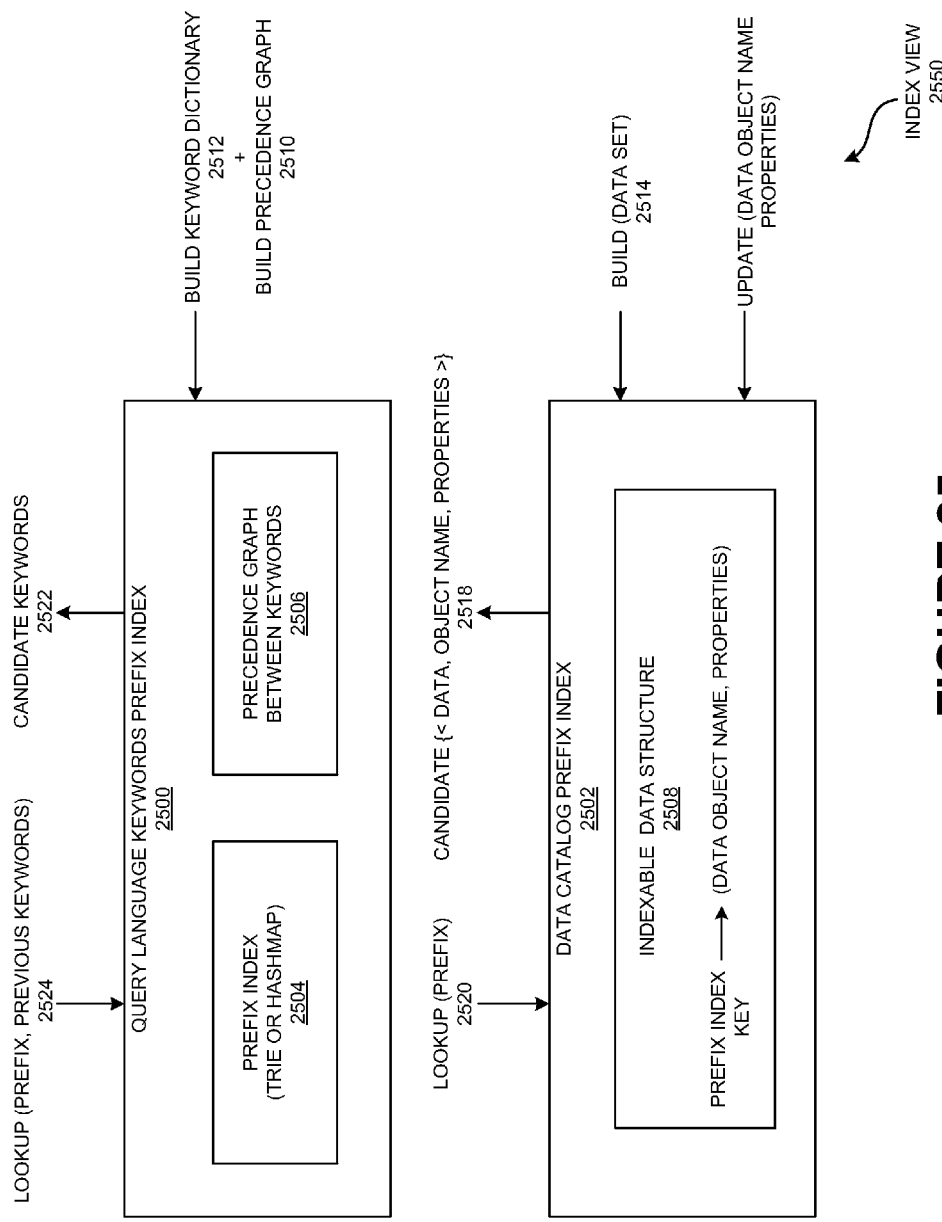
FIG. 25 is a block diagram of the index view 2550 of the query language keywords prefix index 2500 and the data catalog prefix index 2502, in one embodiment.

FIG. 25 is a block diagram of the index view 2550 of the query language keywords prefix index 2500 and the data catalog prefix index 2502, in one embodiment.

A query language keywords prefix index 2500 consists of a prefix index 2504, stored as a trie, hash map, and/or other indexed data structures, and a precedence graph between keywords 2506, in one embodiment. The query language keywords prefix index 2500 supports several operations including, but not limited to, lookup (prefix, previous keywords) 2524, candidate keywords 2522, build keyword dictionary 2512, and build precedence graph 2510, in one embodiment.

The data catalog prefix index 2502 consists of an indexable data structure 2508, such as a trie and/or hash map, implementing a prefix index key to <data object name, properties> tuple, in one embodiment. The data object name could be the physical name and/or the logical name of the object. The data catalog prefix indexes 2502 supports several operations including, but not limited to, lookup (prefix) 2520, candidate 2518, build (data set) 2514, and update (data object name properties) in one embodiment.

Figure 26:
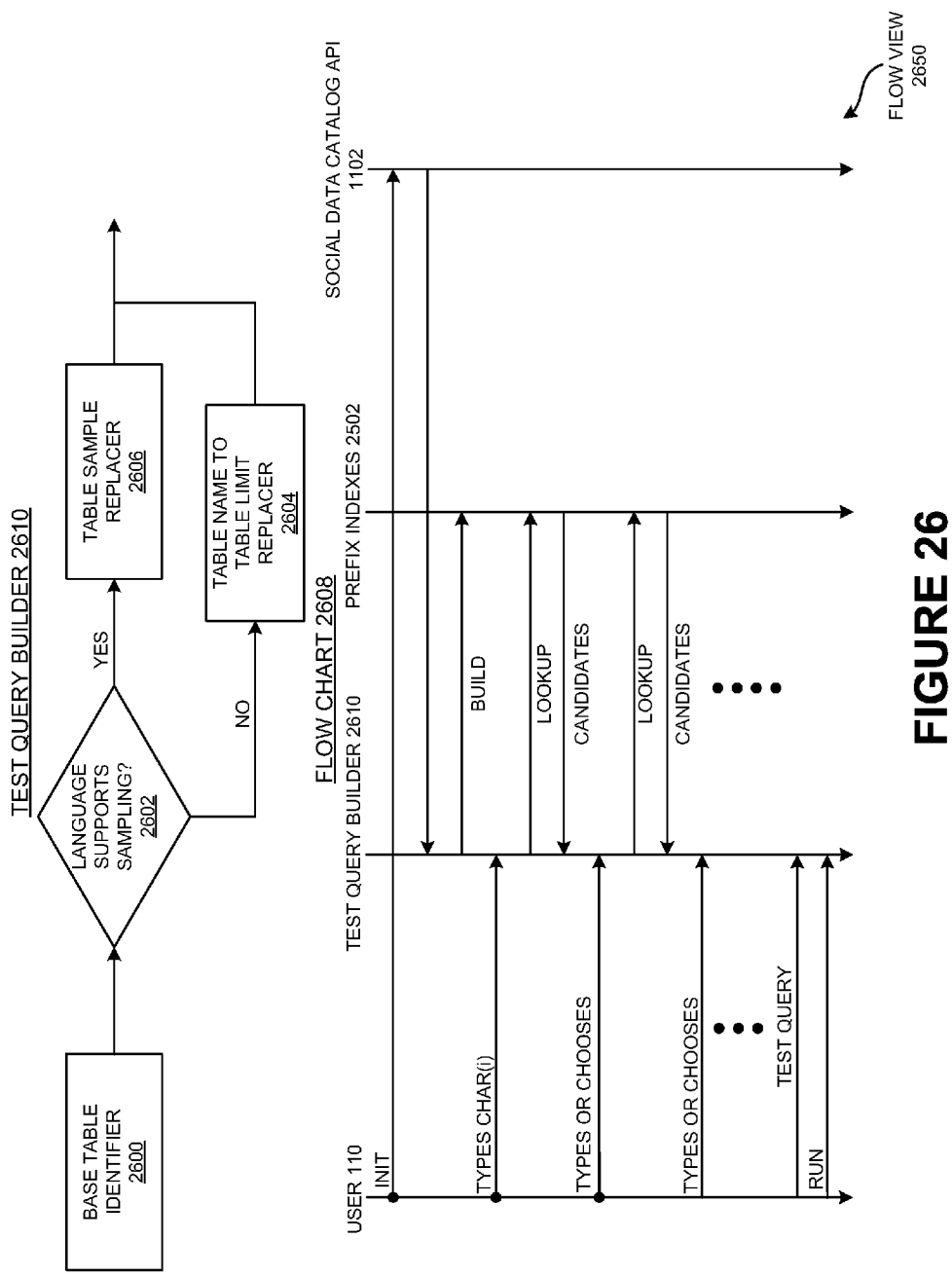
FIG. 26 contains the flow view 2650 of the test query builder 2610, in one embodiment.

FIG. 26 contains the flow view 2650 of the test query builder 2610, in one embodiment. In flow chart 2608, a base table identifier 2600 is provided, if the language supports sampling 2602, then the test query builder 2610 performs the table sample replacer 2606 action, otherwise, the test query builder 2610 performs the table name to table limit replacer 2604 action, in one embodiment.

A typical user 110 use case is described in the interaction diagram 2620 of FIG. 26, in one embodiment. A user 110 initializes the session by sending initialization information to the social data catalog API 1102, which forwards this initialization information to the test query builder 2610, in one embodiment. The test query builder 2610 then builds prefix indexes such as query language keywords prefix index 2500 and/or data catalog prefix index 2502, in one embodiment. The user 110 initially sends a character to the test query builder 2610, a lookup action is performed on the prefix indexes and some numbers of candidates are returned to the test query builder 2610, that then presents the candidates to the user 110 in a front end component 1011, in one embodiment. The user 110 then repeatedly either types another character or choose a candidate from those presented by the front end component 1011 and the partial query maintained by the query builder is sent to the prefix indexes to generate the next round of candidates, in one embodiment. Eventually, the user 110 sends a test query signal to the test query builder 2610, upon which it will issue a test version of the query to the original database 102 and/or the sample database 104, in one embodiment.

In one embodiment, a method of a query editor 100 includes generating a data profile 116 which includes a set of characteristics 125 captured at various granularities of an initial result set 112 generated from an initial query 106 using a processor 132 and a memory 134. The method determines what a user 110 expects in the initial result set 112 of the initial query 106 and/or a subsequent result set(s) 114 of a subsequent query 108 based on the data profile 116 and/or a heuristically estimated data profile. The method includes enabling the user 110 to evaluate a semantic accuracy of the subsequent query 108 based on the likely expectation of the user 110 as determined through the set of characteristics 125 of the data profile 116.

The set of characteristics 125 may include metadata 118 of the initial query 106. For example, the set of characteristics 125 may include a number of attributes in the initial result set 112, a data type of each of the attributes, a frequency of usage per user 110, a uniqueness constraint on the attributes, a nullability of individual attributes, and/or a functional dependency between attributes. The method may determine a match ratio between the subsequent query 108 and the initial query 106. At least some of the set of characteristics 125 of the data profile 116 may be presented to the user 110 based on the match ratio through the query editor 100.

The set of characteristics 125 may include individual row characteristics 120. The data profile 116 may include a random sample of information presented in the initial result set 112. The user 110 may be able to perform a cursory examination of the presented ones of the set of characteristics 125 and/or the random sample of information presented in the initial result set 112 and/or the subsequent result set(s) 114 (e.g., based on the match ratio between the subsequent query 108 and the initial query 106). The set of characteristics 125 may include aggregate statistical characteristics 122 including generic aggregate statistics 124 and scenario aggregate statistics 126. The generic aggregate statistics 124 may be calculated in a manner that is independent of a set of semantics of the attributes. The generic aggregate statistics 126 may be defined through a domain expert. The generic aggregate statistics 126 may be relevant in a particular scenario to enable the incorporation of a domain-specific interpretation of semantics of each attribute and each set of data of the initial result set 112 and/or the subsequent result set(s) 114.

The generic aggregate statistics 124 may include number of rows of the initial result set 112 and/or the subsequent result set(s) 114, a count of distinct values in each attribute, a distribution of attribute values including frequency per attribute value, a pattern of attribute values for attribute values and/or a set of functional dependencies among attribute value pairs. The generic aggregate value statistics may be applicable with no customization by the user 110. The generic aggregate statistics 126 may be programmed via user 110-defined aggregate queries and may be associated with the initial result set 112 and the subsequent result set(s) 114.

The syntax of the user 110-defined aggregate queries may be specific to a standard query processing engine and the signature of the generic aggregate statistics 126 may create the signature corresponds to a set of table valued functions. The method may present the set of characteristics 125 of the data profile 116 to the user 110 through the query editor 100 based on an auto-complete algorithm (e.g., of the auto-complete algorithm module 200) to which the data profile 116 and/or the initial result set 112 and/or the subsequent result will be predicted when a partial input of the initial query 106 and/or the subsequent query 108 is entered in the query editor 100.

The set of characteristics 125 of the data profile 116 may be presented to the user 110 of the query editor 100 through a profile visualizer module 204. The module may generate a visual representation of the data profile 116 in a searchable format and/or a hierarchical format and/or a navigable format. The method may include computing the data profile 116 through a result set profiler module 202 which may map each attribute value of the attribute to the number of times particular value is observed in the attribute and may map patterns exhibited by an attribute value to a count of times pattern is observed in the attribute.

The pattern may be constructed based on a regular expression of string-valued attributes. The method may permit the user 110 to provide a user 110 defined table value function using a visual interface through an application programming interface. The application program interface may consider a data source and/or a table and/or a table value aggregate query data as an input to be registered with the result set profiler. The user 110 may be permitted to mark the subsequent query 108 as completed after an iterative evaluation of the data profile 116 generated from previous queries. The method may generate sample database 104 (e.g., a subset of the original database 102) having an identical schema which includes a potentially biased random sample of all the relations with a reduced set of data. The method may execute the subsequent query 108 through the use of sample database 104 (e.g., a subset of the original database 102) to enable the user 110 to reduce the time in debugging the subsequent query 108.

The method may apply a reservoir sampling algorithm 210 to ensure a constant sample size is maintained. Each row in the subsequent result set(s) 114 of any subsequent query 108 is selected with a same probability in a manner such that a tuple selected by many subsequent queries in a query log is likely to be selected in the potentially biased random sample with a higher probability. The method may generate an aggregate value based on the potentially biased random sample through a heuristical-estimation algorithm 212. The method may monitor the behavior of the user 110 in interacting with the set of characteristics 125 of the data profile 116 when the subsequent query 108 is generated. Further, the method may refine an presentation algorithm which may optimally determines the characteristics to present the user 110 based in further query based on a monitored behavior of the user 110 interacting with initial query 106 and/or the subsequent query 108 in the query editor 100.

In another embodiment, a query editor 100 application includes a result set profiler module 202 to generate a data profile 116 which includes a set of characteristics 125 captured at various granularities of an initial result set 112 generated from an initial query 106 using a processor 132 and a memory 134. The query editor 100 application also includes a heuristical-estimation module (e.g., the estimation module 216) to determine what a user 110 expects the initial result set 112 of the initial query 106 and/or in a subsequent result set(s) 114 of a subsequent query 108 based on the data profile 116 and/or a heuristically estimated data profile. Furthermore, the query editor 100 application includes a profile visualizer module 204 to enable the user 110 to evaluate a semantic accuracy of the subsequent query 108 based on the likely expectation of the user 110 as determined through the set of characteristics 125 of the data profile 116.

In yet another embodiment, a non-transitory medium, readable through a processor 132 and a memory 134, which includes instructions embodied that are executable through the processor 132 and the memory 134 includes the instructions to determine what a user 110 expects in one of an initial result set 112 of an initial query 106 and/or a subsequent result set(s) 114 of a subsequent query 108 based on a data profile 116 and/or a heuristically estimated data profile. The non-transitory medium includes the instructions to enable the user 110 to evaluate a semantic accuracy of the subsequent query 108 based on the likely expectation of the user 110 as determined through a set of characteristics 125 of the data profile 116. The method further includes instructions to present some set of characteristics 125 of the data profile 116 to the user 110 based on the match ratio through the query editor 100.

In one embodiment, a method of a curated answers system 850 includes automatically populating a profile markup page 806 of a user with information 804 describing an initial query 802 of a database 803 that the user 110 has generated using a processor 132 and a memory 134, determining that another user 810 of the database 803 has submitted a similar query 808 that is semantically proximate to the initial query 802 of the database 803 that the user 110 has generated, and presenting the profile markup page 806 of the user 110 to the other user 810. The method of the curated answers system 850 may include enabling the other user 810 to communicate with the user 110 through a communication channel on the profile markup page 806.

A question 900 of the other user 810 may be published to the user 110 on the profile markup page 806 of the user, and/or other profile markup page 812 of the other user 810. The question 900 may be associated as being posted by the other user 810. The method of the curated answers system 850 may include processing a response 902 of the user 110 to the question 900. The response 902 of the user 110 to the question 900 may be published on the profile markup page 806 of the user 110 and/or the other profile markup page 812 of the other user 810. The response 902 may be associated as being posted by the user.

A table indicating a set of profiles 1014 may be automatically generated and associated with different users 1010 that have queried the database 803 with a semantically proximate query to the similar query 808 based on overall the user's and another user's usage of the data objects in the query log. The table may be presented to the other user 810. The system may enable the other user 810 to communicate with any of the different users 1010 associated with the set of profiles 1014. A user group(s) 908 (e.g., that includes the other user 810 and/or the user) may be generated based on a relevancy between the similar query 808 and the initial query 802. Users of the database 803 may be permitted to associate an electronic mailing address 910, a phone number 912, a biography 914, a personal photograph 906, a social media handle 916, and/or an educational background 918 with their profile.

The profile markup page 806 of the other user 810 may be automatically populated with information 804 describing the similar query 808 of the database 803 that the other user 810 has generated. The profile markup page 806 of the user 110 may be automatically populated with information 804 describing the initial query 802 of the database 803 that the user 110 has generated. The other profile markup page 812 of the other user 810 may be automatically populated with information 804 describing the similar query 808 of the database 803. Both these operations (e.g., populating profile markup pages) may be performed through automatic observation and/or monitoring of activity of the user 110 and/or the other user 810 in interacting with the database 803.

A social data catalog table 1016 of information 804 about how users are interacting with the database 803 and/or a sample database 104 may be generated. The social data catalog table 1016 may be populated with a meta data, a logical definition and/or description of attributes, information 804 about usage, page views between users, a social data network, and/or a statistical data profile. Information 804 from external data source 1012s and/or social media profiles may be extracted to generate the social data catalog table 1016 of information 804. Information 804 from a ranked list of knowledgeable users may be crowd sourced to generate a ranked order of priority of information 804 presented in profile pages of the curated answers system 850.

The information 804 about usage may include related tables and/or join predicates as well as relevant filters associated with each table of the database 803 and/or the sample database 104. The social data network may include a list of users who are knowledgeable about a particular object related to the other query. The information 804 may be a metadata such as a schema name, a table in a schema, a name of an attribute, a data type of an attribute, a primary key associated with an attribute, a constraint of an attribute, a functional dependency between attributes, an index, a foreign key, a field name, a column name, a table name, and/or a query description.

A data catalog studio module 1000 that includes a data catalog repository 1004, a data source 1012 registrar 1006, a background extraction component (e.g., background extraction module 1002), a front end component 1011, and/or a user interaction logger 1008 may be generated. The data catalog repository 1004 may store the social data catalog api1102 (e.g., having the social data catalog table 1016), a data object and/or information 804 about the data object. The data catalog repository 1004 may return information 804 about the data object. The data catalog repository 1004 may also update stored information 804 and return a ranked list of relevant data object. Similarly, the data catalog repository 1004 may search and return a list of data object of a given type. The data source 1012 register may register and extract from the data source 1012 declared metadata from a schema.

The front end component 1011 may enable the user 110 and/or the other user 810 to register a data source 1012, upload documentation on the data source 1012, upload the query log, search relevant objects, and/or browse the schema in the data source 1012. The background extraction component (e.g., background extraction module 1002) may automatically profile, locate, extract, and/or associate a documentation of the user 110 and/or the other user 810 in the data source 1012. The background extraction component (e.g., background extraction module 1002) may also automatically profile, locate, extract, and/or associate a query log of the user 110 and/or the other user 810 in the data source 1012. The system may monitor and/or log interactions between the front end component 1011 and/or various users accessing the front end component 1010 that add, delete, reorder, modify, and/or sort information 804 presented in profile pages of users of the curated answers system 850. In addition, the system may auto-generating queries about individual data objects comprising a schema, a table, an attribute, and an attribute value to enable users to automatically communicate with expert users on at least one of these individual data objects and enabling communication with the expert users through a single click methodology in each data page of the data catalog repository. Further, the system may auto-generating a question for a user to post based on observed content comprising at least one of a current details of a page, a title of a page, a description of a page, and a further clarification requested by the user prior to a question posting.

In other embodiment, a method of a curated answers system 850 includes automatically populating a profile markup page 806 of a user with information 804 describing an initial query 802 of a database 803 that the user 110 has generated using a processor 132 and a memory 134, determining that another user 810 of the database 803 has submitted a similar query 808 that is semantically proximate to the initial query 802 of the database 803 that the user 110 has generated, presenting the profile markup page 806 of the user 110 to the other user 810, enabling the other user 810 to communicate with the user 110 through a communication channel on the profile markup page 806, publishing a question 900 of the other user 810 to the user 110 on the profile markup page 806 of the user 110 and/or other profile markup page 812 of the other user 810, associating the question 900 as being posted by the other user 810, processing a response 902 of the user 110 to the question 900, publishing the response 902 of the user 110 to the question 900 on the profile markup page 806 of the user 110 and/or the other profile markup page 812 of the other user 810, and associating the response 902 as being posted by the user.

In yet other embodiment, a curated answers system 850 includes a data catalog module to automatically populate a profile markup page 806 of a user with information 804 describing an initial query 802 of a database 803 that the user 110 has generated using a processor 132 and a memory 134, a social catalog module to determine that another user 810 of the database 803 has submitted a similar query 808 that is semantically proximate to the initial query 802 of the database 803 that the user 110 has generated, and a front end component 1010 to present the profile markup page 806 of the user 110 to the other user 810.

In one embodiment, a method includes automatically generating an editable markup page 2200 and/or a page name 2202 based on an initial query 802 of a database 803 using a processor 132 and a memory 134, associating the generated markup page with a user of the database 803, and appending information to the editable markup page 2200 based on a similar query 808 of the database 803 by another user 810. The method may include permitting other user 810s of the database 803 to access, modify, append, and/or delete entries from the editable markup page 2200.

Each edit may be tracked by the other user 810s in a log file. The log file may be presented on the markup page such that visitors to the editable markup page 2200 have visible to them a change history of the editable markup page 2200 by various users of the database 803. A set of rules may be created in which any user can flag an edit made by any user of the database 803 as being marked for deletion. other user 810s may be permitted to vote on whether the edit made should be deleted. The editable markup page 2200 may be restored to a state prior to the edit being made based on a successful vote of the other user 810s of the database 803.

A profile markup page of the user may be automatically populated with information describing the initial query 802 of a database 803 that the user has generated. It may be determined that other user 810 of the database 803 has submitted a similar query 808 that is semantically proximate to the initial query 802 of the database 803 that the user has generated. The profile markup page of the user may be presented to the other user 810. Information may be automatically appended about the similar query 808 that is semantically proximate to the initial query 802 of the database 803 on the editable markup page 2200.

The other user 810 may be enabled to communicate with the user through a communication channel on the profile markup page. A question of the other user 810 to the user may be published on the profile markup page of the user and/or other profile markup page of the other user 810. The question may be associated as being posted by the other user 810. A response of the user to the question may be processed and published on the profile markup page of the user, the other profile markup page of the other user 810 and/or on the editable markup page 2200. The response may be associated as being posted by the user.

Users of the database 803 may be permitted to associate an electronic mailing address, a phone number, a biography, a personal photograph, a social media handle, and/or an educational background with their profile associated the editable markup page 2200. The other profile markup page of the other user 810 may be automatically populated with information describing the similar query 808 of the database 803 that the other user 810 has generated. The automatic population of the profile markup page and/or the editable mark up page may be performed through automatic observation and/or monitoring of activity of the user and/or the other user 810 in interacting with the database 803. A social data catalog table may be generated that populates the editable markup page 2200.

Relationships between different data objects including popular tables, popular attributes, co-queried attributes in a table, related tables, joinable columns, joinable predicates, and/or relevant filter for each table using the social data catalog table may be associated. Relationships between data objects and/or users includes a list of knowledgeable people who may be contacted about particular objects using the social data catalog table may also be associated. Queries may be parsed into constituent fragments. Results of parsed queries may be aggregated, normalized and/or stored. Information may be mined using the results of the parsed queries to populate the social data catalog.

The social data catalog associated with the editable markup page 2200 may be populated with information from crawled query logs, analyzed application logs, and/or a query editing tool. The crawling query logs may ingest queries from files where users store queries. Application logs may be analyzed for queries. Query editing tools may be added to the social data catalog to develop and/or append developed queries to the editable markup page 2200. A social data catalog module may implement a materialized computation and/or an on-demand/or computation as an alternative to an Application Programming Interface (API) function. The materialized computation may involve periodically mining query logs to update a query reference table with new queries that have not been previously processed as well as materializing and/or indexing derived information of different data objects.

On-demand computation may involve indexing the query reference table using various objects that each row references.

The social data catalog table may be populated with a meta data, a logical definition and/or description of attributes, information about usage, page views between users, a social data network, and/or a statistical data profile. Information may be extracted from external data sources and/or social media profiles to generate the social data catalog table of information. Information may be crowdsourced from a ranked list of knowledgeable users to generate a ranked order of priority of information presented in profile pages of the curated answers system.

The information about usage may include related tables and/or join predicates as well as relevant filters associated with each table of the original database 102 and/or the sample database 104. The social data network may include a list of users who are knowledgeable about a particular object related to the other query. The information may be a metadata that includes a schema name, a table in a schema, a name of an attribute, a data type of an attribute, a primary key associated with an attribute, a constraint of an attribute, a functional dependency between attributes, an index, a foreign key, a field name, a column name, a table name, and/or a query description.

A data catalog studio may be associated with the editable markup page 2200. A data catalog repository, a data source registrar, a background extraction component, a frontend component, and/or a user interaction logger may be generated in the data catalog studio. The data catalog repository may store the social data catalog, may store a data object and/or information about the data object, and may return information about the data object. The data catalog repository may also update stored information and return a ranked list of relevant data object. In addition, the data catalog repository may search and return a list of data object of a given type. A data source may be registered.

The data source may extract declared metadata from a schema using the data source registrar. The user and/or the other user 810 may be enabled to register a data source, upload documentation on the data source, upload the query log, search relevant objects, and/or browse the schema in the data source using the front end component. A documentation and/or a query log of the user and/or the other user 810 may be automatically profiled, located, extracted and/or associated in the data source using the background extraction component. Interactions between the front end component and/or various users accessing the front end component may be monitored or logged to add, delete, reorder, modify, and/or sort information presented in profile pages of users of a curated answers system.

In other embodiment, a method includes automatically generating an editable markup page 2200 and/or a page name 2202 based on an initial query 802 of a database 803 using a processor 132 and a memory 134, associating the generated markup page with a user of the database 803, appending information to the editable markup page 2200 based on a similar query 808 of the database 803 by another user 810, permitting other user 810s of the database 803 to access, modify, append, or delete the editable markup page 2200.

In yet other embodiment, a collaborative database knowledge repository (e.g., the collaborative database management system 2250) includes a social database catalog module having a social data catalog table to populate an editable markup page 2200 of the collaborative database knowledge repository (e.g., the collaborative database management system 2250). The social data catalog table associates relationships between different data objects includes popular tables, popular attributes, co-queried attributes in a table, related tables, joinable columns, joinable predicates, and/or relevant filter for each table using the social data catalog table.

The collaborative database knowledge repository (e.g., the collaborative database management system 2250) also includes a data catalog studio to associate with the editable markup page 2200 and to generate in the data catalog studio a data catalog repository, a data source registrar, a background extraction component, a frontend component, and/or a user interaction logger.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software and/or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., data processing system 130). Accordingly, the specification and drawings are to be regarded in an illustrative rather than a restrictive sense.

A number of embodiments have been described. Nevertheless, it will be understood that various modifications may be made without departing from the spirit and scope of the claimed invention. In addition, the logic flows depicted in the figures do not require the particular order shown, and/or sequential order, to achieve desirable results. In addition, other steps may be provided, and/or steps may be eliminated, from the described flows, and other components may be added to, and/or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method of a query editor comprising:
generating a data profile comprising a set of characteristics captured at various granularities of an initial result set generated from an initial query of a database using a processor and a memory;
determining what a user expects in at least one of the initial result set of the initial query and a subsequent result set of a subsequent query based on one of the data profile and a heuristically estimated data profile;
enabling the user to evaluate a semantic accuracy of the subsequent query based on a likely expectation of the user as determined through the set of characteristics of the data profile;

generating a social data catalog table of information about how users are interacting with at least one of the database and a sample database;

populating the social data catalog table with metadata, a logical definition and description of attributes, information about usage, page views between the users, a social data network, and a statistical data profile;

extracting information from external data sources and social media profiles to generate the social data catalog table of information; and crowd sourcing information from a ranked list of knowledgeable users to generate a ranked order of priority of information presented in profile pages of a curated answers system, wherein the information about usage includes related tables and join predicates as well as relevant filters associated with each table of the at least one of the database and the sample database, wherein the social data network includes a list of users who are knowledgeable about a particular object related to the another query, and wherein the metadata is at least one of a schema name, a table in a schema, a name of an attribute, a data type of the attribute, a primary key associated with the attribute, a constraint of the attribute, a functional dependency between the attributes, an index, a foreign key, a field name, a column name, a table name, and a query description.

2. The method of claim 1,
wherein the set of characteristics includes metadata of the initial query comprising at least one of:
a number of attributes in the initial result set,
a data type of each of the attributes,
a frequency of usage per user,
a uniqueness constraint on the attributes,
anullability of individual attributes, and
a functional dependency between the attributes.

3. The method of claim 1, further comprising:
determining a match ratio between the subsequent query and the initial query; and
presenting at least some of the set of characteristics of the data profile to the user based on the match ratio through the query editor.

4. The method of claim 3,
wherein the set of characteristics includes individual row characteristics, and
wherein the data profile includes a random sample of information presented in the initial result set
to enable the user perform a cursory examination of at least one of the presented ones of the at least some of the set of characteristics and a random sample of information presented in the at least one of the initial result set and the subsequent result set based on the match ratio between the subsequent query and the initial query.

5. The method of claim 1,
wherein the set of characteristics includes aggregate statistical characteristics comprising at least one of generic aggregate statistics and scenario aggregate statistics,
wherein the generic aggregate statistics are calculated in a manner that is independent of a set of semantics of the attributes, and
wherein the scenario aggregate statistics are defined through a domain expert and are relevant in a particular scenario to enable incorporation of a domain-specific interpretation of semantics of each attribute and each set of data of the at least one of the initial result set and the subsequent result set.

6. The method of claim 5,
wherein the generic aggregate statistics include:
a number of rows in the at least one of the initial result set and the subsequent result set,
a count of distinct values in the each attribute,
a distribution of attribute values including frequency per attribute value,
a pattern of the attribute values, and
a set of functional dependencies among attribute value pairs, and
wherein the generic aggregate statistics are applicable with no customization by the user.

7. The method of claim 5,
wherein the scenario aggregate statistics are programmed via user-defined aggregate queries associated with the at least one of the initial result set and the subsequent result set,
wherein a syntax of the user-defined aggregate queries is specific to a standard query processing engine, and
wherein a signature of the scenario aggregate statistics creates a signature that corresponds to a set of table valued functions.

8. The method of claim 1, further comprising:
presenting the set of characteristics of the data profile to the user through the query editor based on an auto-complete algorithm in which at least one of the data profile, the initial result set and the subsequent result set is predicted when a partial input of at least one of the initial query and the subsequent query is entered in the query editor.

9. The method of claim 1, wherein the set of characteristics of the data profile is presented to the user of the query editor through a profile visualizer module which generates a visual representation of the data profile in at least one of a searchable format, a hierarchical format, and a navigable format.

10. The method of claim 1, further comprising computing the data profile through a result set profiler module through which:
a first set of hash tables maps each attribute value of an attribute to a number of times a particular value is observed in the attribute,
a second set of hash tables maps patterns exhibited by an attribute value to a count of times a pattern is observed in the attribute,
wherein the pattern is constructed based on a regular expression of string-valued attributes.

11. The method of claim 10, further comprising:
permitting the user to provide a user defined table value function using a visual interface through an application programming interface, wherein the application programming interface considers at least one of a data source, a table, and a table value aggregate query data as an input to be registered with the result set profiler module; and
permitting the user to mark the subsequent query as completed after an iterative evaluation of the data profile generated from previous queries.

12. The method of claim 1, further comprising:
generating the sample database having an identical schema as that of an original database using a database sampler module, wherein the sample database comprises a potentially biased random sample of all relations with a reduced set of data;

executing the subsequent query efficiently through use of the sample database to enable the user reduce a time in debugging the subsequent query; and computing an estimated data profile from the sample database.

13. The method of claim 12, further comprising applying a reservoir sampling algorithm to ensure that a constant sample size is maintained such that each row in the subsequent result set of any subsequent query is selected with a same probability in a manner such that a tuple that is selected by many subsequent queries in a query log is likely to be selected in the potentially biased random sample with a higher probability.

14. The method of claim 12, further comprising:

generating an estimate of an aggregate value based on the potentially biased random sample through a heuristical-estimation algorithm.

15. The method of claim 1, further comprising:

monitoring a behavior of the user in interacting with the set of characteristics of the data profile when the subsequent query is generated; and refining an presentation algorithm that optimally determines which characteristics to present to the user in a further query based on the monitored behavior of the user in interacting with at least one of the initial query and the subsequent query in the query editor.

16. A non-transitory medium, readable through a processor communicatively coupled to a memory and comprising instructions embodied therein that are executable through the processor, comprising:

instructions to generate a data profile comprising a set of characteristics captured at various granularities of an initial result set generated from an initial query of a database;

instructions to determine what a user expects in at least one of the initial result set of the initial query and a subsequent result set of a subsequent query based on one of the data profile and a heuristically estimated data profile;

instructions to enable the user to evaluate a semantic accuracy of the subsequent query based on a likely expectation of the user as determined through the set of characteristics of the data profile;

instructions to generate a social data catalog table of information about how users are interacting with at least one of the database and a sample database;

instructions to populate the social data catalog table with metadata, a logical definition and description of attributes, information about usage, page views between the users, a social data network, and a statistical data profile;

instructions to extract information from external data sources and social media profiles to generate the social data catalog table of information; and instructions to crowd source information from a ranked list of knowledgeable users to generate a ranked order of priority of information presented in profile pages of a curated answers system, wherein the information about usage includes related tables and join predicates as well as relevant filters associated with each table of the at least one of the database and the sample database, wherein the social data network includes a list of users who are knowledgeable about a particular object related to the another query, and wherein the metadata is at least one of a schema name, a table in a schema, a name of an attribute, a data type of the attribute, a primary key associated with the attribute, a constraint of the attribute, a functional dependency between the attributes, an index, a foreign key, a field name, a column name, a table name, and a query description.

17. The non-transitory medium of claim 16, comprising instructions compatible with:

the set of characteristics including metadata of the initial query comprising at least one of:

a number of attributes in the initial result set, a data type of each of the attributes, a frequency of usage per user, a uniqueness constraint on the attributes, anullability of individual attributes, and a functional dependency between the attributes.

18. The non-transitory medium of claim 16, comprising:

instructions to determine a match ratio between the subsequent query and the initial query; and instructions to present at least some of the set of characteristics of the data profile to the user based on the match ratio through a query editor.

19. The non-transitory medium of claim 18, comprising instructions compatible with:

the set of characteristics including individual row characteristics, and the data profile including a random sample of information presented in the at least one of the initial result set and the subsequent result set to enable the user perform a cursory examination of at least one of the presented ones of the at least some of the set of characteristics and a random sample of information presented in the initial result set based on the match ratio between the subsequent query and the initial query.

20. The non-transitory medium of claim 16, comprising instructions compatible with:

the set of characteristics including aggregate statistical characteristics comprising at least one of generic aggregate statistics and scenario aggregate statistics, the generic aggregate statistics being calculated in a manner that is independent of a set of semantics of the attributes, and the scenario aggregate statistics being defined through a domain expert and being relevant in a particular scenario to enable incorporation of a domain-specific interpretation of semantics of each attribute and each set of data of the at least one of the initial result set and the subsequent result set.

21. The non-transitory medium of claim 20, comprising instructions compatible with:

the generic aggregate statistics including:

a number of rows in the at least one of the initial result set and the subsequent result set, a count of distinct values in the each attribute, a distribution of attribute values including frequency per attribute value, a pattern of the attribute values, and a set of functional dependencies among attribute value pairs, and the generic aggregate statistics being applicable with no customization by the user.

22. The non-transitory medium of claim 20, comprising instructions compatible with:

the scenario aggregate statistics being programmed via user-defined aggregate queries associated with the at least one of the initial result set and the subsequent result set, a syntax of the user-defined aggregate queries being specific to a standard query processing engine, and a signature of the scenario aggregate statistics creating a signature that corresponds to a set of table valued functions.

23. The non-transitory medium of claim 16, further comprising:
instructions to present the set of characteristics of the data profile to the user through a query editor based on an auto-complete algorithm in which at least one of the data profile, the initial result set and the subsequent result set is predicted when a partial input of at least one of the initial query and the subsequent query is entered in the query editor.

24. The non-transitory medium of claim 16, further comprising instructions to present the set of characteristics of the data profile to the user through a profile visualizer module which generates a visual representation of the data profile in at least one of a searchable format, a hierarchical format, and a navigable format.

25. The non-transitory medium of claim 16, further comprising instructions to compute the data profile through a result set profiler module through which:
a first set of hash tables maps each attribute value of an attribute to a number of times a particular value is observed in the attribute,
a second set of hash tables maps patterns exhibited by an attribute value to a count of times a pattern is observed in the attribute,
wherein the pattern is constructed based on a regular expression of string-valued attributes.

26. The non-transitory medium of claim 25, comprising instructions compatible with:
the user providing a user defined table value function using a visual interface through an application programming interface,
the application programming interface considering at least one of a data source, a table, and a table value aggregate query data as an input to be registered with the result set profiler module, and
the user being permitted to mark the subsequent query as completed after an iterative evaluation of the data profile generated from previous queries.

27. The non-transitory medium of claim 16, further comprising:
instructions to generate the sample database having an identical schema as that of an original database using a database sampler module, wherein the sample database comprises a potentially biased random sample of all relations with a reduced set of data, and
instructions to execute the subsequent query efficiently through use of the sample database to enable the user to reduce a time in debugging the subsequent query.

28. The non-transitory medium of claim 27, further comprising:
instructions to apply a reservoir sampling algorithm to ensure that a constant sample size is maintained such that each row in the subsequent result set of any subsequent query is selected with a same probability in a manner such that a tuple that is selected by many subsequent queries in a query log is likely to be selected in the potentially biased random sample with a higher probability.

29. The non-transitory medium of claim 27, further comprising instructions to generate an estimate of an aggregate value based on the potentially biased random sample through a heuristical-estimation algorithm.

30. The non-transitory medium of claim 16, comprising instructions compatible with:

a behavior of the user in interacting with the set of characteristics of the data profile being monitored when the subsequent query is generated, and
a presentation algorithm that optimally determines which characteristics to present to the user being refined in a further query based on the monitored behavior of the user in interacting with at least one of the initial query and the subsequent query in the query editor.

31. A system comprising:
a memory; and
a processor communicatively coupled to the memory, the processor being configured to execute instructions to:
generate a data profile comprising a set of characteristics captured at various granularities of an initial result set generated from an initial query of a database,
determine what a user expects in at least one of the initial result set of the initial query and a subsequent result set of a subsequent query based on one of the data profile and a heuristically estimated data profile,
enable the user to evaluate a semantic accuracy of the subsequent query based on a likely expectation of the user as determined through the set of characteristics of the data profile,
generate a social data catalog table of information about how users are interacting with at least one of the database and a sample database,
populate the social data catalog table with metadata, a logical definition and description of attributes, information about usage, page views between the users, a social data network, and a statistical data profile,
extract information from external data sources and social media profiles to generate the social data catalog table of information, and
crowd source information from a ranked list of knowledgeable users to generate a ranked order of priority of information presented in profile pages of a curated answers system,
wherein the information about usage includes related tables and join predicates as well as relevant filters associated with each table of the at least one of the database and the sample database,
wherein the social data network includes a list of users who are knowledgeable about a particular object related to the another query, and
wherein the metadata is at least one of a schema name, a table in a schema, a name of an attribute, a data type of the attribute, a primary key associated with the attribute, a constraint of the attribute, a functional dependency between the attributes, an index, a foreign key, a field name, a column name, a table name, and a query description.

32. The system of claim 31,
wherein the set of characteristics includes metadata of the initial query comprising at least one of:
a number of attributes in the initial result set,
a data type of each of the attributes,
a frequency of usage per user,
a uniqueness constraint on the attributes,
anullability of individual attributes, and
a functional dependency between the attributes.

33. The system of claim 31, wherein the processor is further configured to execute instructions to:
determine a match ratio between the subsequent query and the initial query, and
present at least some of the set of characteristics of the data profile to the user based on the match ratio through the query editor.

34. The system of claim 33,
wherein the set of characteristics includes individual row characteristics, and
wherein the data profile includes a random sample of information presented in the initial result set
to enable the user perform a cursory examination of at least one of the presented ones of the at least some of the set of characteristics and a random sample of information presented in the at least one of the initial result set and the subsequent result set based on the match ratio between the subsequent query and the initial query.

35. The system of claim 31,
wherein the set of characteristics includes aggregate statistical characteristics comprising at least one of generic aggregate statistics and scenario aggregate statistics,
wherein the generic aggregate statistics are calculated in a manner that is independent of a set of semantics of the attributes, and
wherein the scenario aggregate statistics are defined through a domain expert and are relevant in a particular scenario to enable incorporation of a domain-specific interpretation of semantics of each attribute and each set of data of the at least one of the initial result set and the subsequent result set.

36. The system of claim 35,
wherein the generic aggregate statistics include:
a number of rows in the at least one of the initial result set and the subsequent result set,
a count of distinct values in the each attribute,
a distribution of attribute values including frequency per attribute value,
a pattern of the attribute values, and
a set of functional dependencies among attribute value pairs, and
wherein the generic aggregate statistics are applicable with no customization by the user.

37. The system of claim 35,
wherein the scenario aggregate statistics are programmed via user-defined aggregate queries associated with the at least one of the initial result set and the subsequent result set,
wherein a syntax of the user-defined aggregate queries is specific to a standard query processing engine, and
wherein a signature of the scenario aggregate statistics creates a signature that corresponds to a set of table valued functions.

38. The system of claim 31, wherein the processor is further configured to execute instructions to:
present the set of characteristics of the data profile to the user through a query editor based on an auto-complete algorithm in which at least one of the data profile, the initial result set and the subsequent result set is predicted when a partial input of at least one of the initial query and the subsequent query is entered in the query editor.

39. The system of claim 31, wherein the set of characteristics of the data profile is presented to the user of the query editor through a profile visualizer module which generates a visual representation of the data profile in at least one of a searchable format, a hierarchical format, and a navigable format, the profile visualize module executing on the processor.

40. The system of claim 31, wherein the processor is further configured to execute instructions to compute the data profile through a result set profiler module through which:
a first set of hash tables maps each attribute value of an attribute to a number of times a particular value is observed in the attribute,
a second set of hash tables maps patterns exhibited by an attribute value to a count of times a pattern is observed in the attribute,
wherein the pattern is constructed based on a regular expression of string-valued attributes.

41. The system of claim 40, wherein the processor is further configured to execute instructions to:
permit the user to provide a user defined table value function using a visual interface through an application programming interface, wherein the application programming interface considers at least one of a data source, a table, and a table value aggregate query data as an input to be registered with the result set profiler module, and
permit the user to mark the subsequent query as completed after an iterative evaluation of the data profile generated from previous queries.

42. The system of claim 31, wherein the processor is further configured to execute instructions to:
generate the sample database having an identical schema as that of an original database using a database sampler module, wherein the sample database comprises a potentially biased random sample of all relations with a reduced set of data,
execute the subsequent query efficiently through use of the sample database to enable the user reduce a time in debugging the subsequent query, and
compute an estimated data profile from the sample database.

43. The system of claim 42, wherein the processor is further configured to execute instructions to apply a reservoir sampling algorithm to ensure that a constant sample size is maintained such that each row in the subsequent result set of any subsequent query is selected with a same probability in a manner such that a tuple that is selected by many subsequent queries in a query log is likely to be selected in the potentially biased random sample with a higher probability.

44. The system of claim 42, wherein the processor is further configured to execute instructions to:
generate an estimate of an aggregate value based on the potentially biased random sample through a heuristical-estimation algorithm.

45. The system of claim 31, wherein the processor is further configured to execute instructions to:
monitor a behavior of the user in interacting with the set of characteristics of the data profile when the subsequent query is generated, and
refine an presentation algorithm that optimally determines which characteristics to present to the user in a further query based on the monitored behavior of the user in interacting with at least one of the initial query and the subsequent query in the query editor.

* * * * *